(12) United States Patent
Jun

(10) Patent No.: US 12,483,790 B2
(45) Date of Patent: Nov. 25, 2025

(54) ACTUATOR FOR CAMERA AND CAMERA MODULE INCLUDING THE SAME

(71) Applicant: SAMSUNG ELECTRO-MECHANICS CO., LTD., Suwon-si (KR)

(72) Inventor: Jaewoo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 281 days.

(21) Appl. No.: 18/337,675

(22) Filed: Jun. 20, 2023

(65) Prior Publication Data
US 2024/0210789 A1    Jun. 27, 2024

(30) Foreign Application Priority Data
Dec. 26, 2022    (KR) .................... 10-2022-0184352

(51) Int. Cl.
*H04N 23/68*    (2023.01)
*G03B 3/10*    (2021.01)
(Continued)

(52) U.S. Cl.
CPC ............. *H04N 23/687* (2023.01); *G03B 3/10* (2013.01); *G03B 5/00* (2013.01); *G03B 5/06* (2013.01);
(Continued)

(58) Field of Classification Search
None
See application file for complete search history.

(56) References Cited

U.S. PATENT DOCUMENTS

| 2012/0019675 A1 | 1/2012 | Brown |
| 2020/0073200 A1 | 3/2020 | Eom |
| (Continued) | | |

FOREIGN PATENT DOCUMENTS

| CN | 112399057 A | * | 2/2021 | ............. H04N 23/54 |
| CN | 113840052 A | * | 12/2021 | ............. H04N 23/50 |
| (Continued) | | | | |

OTHER PUBLICATIONS

Korean Office Action issued on Sep. 20, 2024, in corresponding Korean Patent Application No. 10-2022-0184352 (4pages in English, 4 pages in Korean).

(Continued)

*Primary Examiner* — Paul M Berardesca
(74) *Attorney, Agent, or Firm* — NSIP Law

(57) ABSTRACT

An actuator includes: a base; first, second, and third moving frames stacked on the base; an image sensor mounted on the first moving frame; a first sensor driving portion including first frame driving members and first shape memory alloy wires disposed outside an edge of the first moving frame to drive the first moving frame in a first direction perpendicular to the optical axis; a second sensor driving portion including second frame driving members and second shape memory alloy wires disposed outside an edge of the second moving frame to drive the second moving frame in a second direction perpendicular to the first direction; and a third sensor driving portion including third frame driving members and third shape memory alloy wires disposed outside an edge of the third moving frame to rotatably drive the third moving frame based on the optical axis.

10 Claims, 40 Drawing Sheets

(51) Int. Cl.
  *G03B 5/00*    (2021.01)
  *G03B 5/06*    (2021.01)
  *G03B 30/00*   (2021.01)
  *H04N 23/54*   (2023.01)
  *H04N 23/57*   (2023.01)

(52) U.S. Cl.
  CPC .............. *G03B 30/00* (2021.01); *H04N 23/54* (2023.01); *H04N 23/57* (2023.01); *G03B 2205/0023* (2013.01); *G03B 2205/0038* (2013.01); *G03B 2205/0076* (2013.01)

(56) References Cited

U.S. PATENT DOCUMENTS

| | | | |
|---|---|---|---|
| 2020/0120238 A1 | 4/2020 | Kim et al. | |
| 2022/0086311 A1 | 3/2022 | Jun | |
| 2022/0206362 A1* | 6/2022 | Ni | H04N 23/55 |
| 2022/0232165 A1* | 7/2022 | Huang | H04N 23/687 |
| 2022/0353416 A1 | 11/2022 | Kwon et al. | |
| 2023/0146186 A1* | 5/2023 | Jun | G03B 5/00 |
| | | | 348/208.11 |
| 2023/0224588 A1* | 7/2023 | Kim | F03G 7/064 |
| | | | 348/207.99 |
| 2023/0314908 A1* | 10/2023 | Xia | H02K 11/215 |
| | | | 359/824 |
| 2024/0004265 A1* | 1/2024 | Liu | H04N 23/54 |
| 2024/0380976 A1* | 11/2024 | Tang | H04N 23/57 |

FOREIGN PATENT DOCUMENTS

| | | | | |
|---|---|---|---|---|
| CN | 113840053 A | * | 12/2021 | ........... H04N 23/687 |
| CN | 114245001 A | * | 3/2022 | ........... H04N 23/685 |
| CN | 114257710 A | * | 3/2022 | ........... H04N 23/685 |
| JP | 2000-187256 A | | 7/2000 | |
| KR | 10-2020-0042260 A | | 4/2020 | |
| KR | 102106525 B1 | * | 5/2020 | ........... H04N 5/2254 |
| KR | 10-2125086 B1 | | 6/2020 | |
| KR | 20210087782 A | * | 7/2021 | ............... G03B 5/00 |
| KR | 20210123091 A | * | 10/2021 | ............. G03B 30/00 |
| KR | 10-2022-0037266 A | | 3/2022 | |
| KR | 10-2022-0047134 A | | 4/2022 | |
| KR | 10-2022-0149388 A | | 11/2022 | |
| WO | WO 2010/089529 A1 | | 8/2010 | |
| WO | WO-2022106856 A1 | * | 5/2022 | ............... G03B 5/02 |

OTHER PUBLICATIONS

Korean Final Office Action issued on May 26, 2025, in corresponding Korean Patent Application No. 10-2022-0184352. (3pages in English, 4pages in Korean).

* cited by examiner

ACTUATOR FOR CAMERA AND CAMERA MODULE INCLUDING THE SAME

CROSS-REFERENCE TO RELATED APPLICATION

This application claims priority to and the benefit under 35 USC 119(a) of Korean Patent Application No. 10-2022-0184352 filed in the Korean Intellectual Property Office on Dec. 26, 2022, the entire contents of which are incorporated herein by reference for all purposes.

BACKGROUND

Field

The following description relates to an actuator for a camera and a camera module including the same.

Description of the Background

Cameras have been basically adopted in portable electronic devices such as smart phones, tablet PCs, and laptop computers. As competition for product differentiation of portable electronic devices intensifies, cases of applying general digital camera functions to portable electronic device cameras are increasing.

In order to create a high resolution image in the camera module, an actuator with a focus adjustment function and a shake compensation function is provided. Therefore, it is necessary to develop an actuator that can improve camera performance by controlling the operation of the sensor and lens module more precisely and in various ways.

The above information disclosed in this Background section is only for enhancement of understanding of the background of the invention, and therefore it may contain information that does not form the prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for a camera includes: a base; a first moving frame, a second moving frame, and a third moving frame stacked on the base along an optical axis; an image sensor mounted on the first moving frame; a first sensor driving portion including a plurality of first frame driving members and a plurality of first shape memory alloy wires disposed outside an edge of the first moving frame and interlocked with each other to drive the first moving frame in a first direction perpendicular to the optical axis; a second sensor driving portion including a plurality of second frame driving members and a plurality of second shape memory alloy wires disposed outside an edge of the second moving frame and interlocked with each other to drive the second moving frame in a second direction perpendicular to the first direction; and a third sensor driving portion including a plurality of third frame driving members and a plurality of third shape memory alloy wires disposed outside an edge of the third moving frame and interlocked with each other to rotatably drive the third moving frame based on the optical axis.

The first moving frame may include a first stepped portion extending along a pair of opposite sides of the first moving frame, the second moving frame may include a second stepped portion having a shape that is complementary to the first stepped portion disposed along a pair of opposite sides of the second moving frame, and the first stepped portion may be configured to be engaged with the second stepped portion with a space therebetween.

A first end of each of the first frame driving members may be fixed to be rotatable outside one corner of the first moving frame and a second end of each of the first frame driving members may contact the edge of the first moving frame, each of the first shape memory alloy wires may be respectively coupled to the first end of each of the first frame driving members to provide rotation driving force, a first end of each of the second frame driving members may be fixed to be rotatable outside one corner of the second moving frame and a second end of each of the second frame driving members may contact the edge of the second moving frame, and each of the second shape memory alloy wires may be respectively coupled to the first end of each of the second frame driving members to provide rotation driving force.

The second moving frame may include an expansion portion extending outward along a pair of opposite sides of the second moving frame, the third moving frame may include a third stepped portion extending along a pair of opposite sides of the third moving frame, and the third stepped portion may be raised and have a shape retracted outward from an inner edge of the third moving frame, and the expansion portion may be coupled to the third stepped portion through a retracted space of the third stepped portion with a space therebetween.

A first end of each of the third frame driving members may be fixed to be rotatable at the edge of the third moving frame and a second end of each of the third frame driving members may contact with the outside of one corner of the third moving frame, and each of the third shape memory alloy wires may be respectively coupled to the first end of each of the third frame driving members to provide rotation driving force.

The base may include a guide member disposed in a region where four corners of the third moving frame are disposed and may be formed in a shape that is bent toward a center by being protruded on the base.

The plurality of first frame driving members may include a pair of first frame driving members, each of the pair of first frame driving members may be disposed diagonally opposite to the second moving frame, the plurality of second frame driving members may include a pair of second frame driving members, and each of the pair of second frame driving members may be disposed diagonally opposite to the third moving frame.

The plurality of third frame driving members may include a first pair of third frame driving members and a second pair of third frame driving members, each of the first pair of third frame driving members may be disposed diagonally opposite to the base, and each of the second pair of third frame driving members may be disposed on the base to be symmetrical with the first pair of third frame driving members with a straight line that passes through the optical axis and parallel to the base as an axis.

In another general aspect, an actuator for a camera includes: a first lens driving member including a first holder disposed to surround a lens module and a plurality of first driving arms disposed on the side of the first holder and extending in all directions perpendicular to an optical axis; a second lens driving member including a second holder disposed to surround the lens module and a plurality of second driving arms disposed on the side of the second holder and extending in all directions perpendicular to the optical axis, and disposed on one side of the first lens driving member along the optical axis; a plurality of first shape memory alloy wires disposed over the plurality of first driving arms and configured to generate a driving force downward parallel to the optical axis; and a plurality of second shape memory alloy wires disposed over the plurality of second driving arms and configured to generate a driving force in an upward direction parallel to the optical axis.

The actuator may include an elastic member disposed between the first lens driving member and the second lens driving member.

The first holder and the second holder may each have a ring shape.

Each of the first drive arms may have a cylinder shape that is protruded in a direction perpendicular to the optical axis from the first holder, and each of the second driving arms may have a cylinder shape that is protruded in a direction perpendicular to the optical axis from the second holder.

Each of the first driving arms may include a first driving groove configured to catch each of the first shape memory alloy wires, and each of the second driving arms may include a second driving groove configured to catch each of the second shape memory alloy wires.

Each of the first shape memory alloy wires may contact an upper surface of the of the first driving groove in an optical axis direction.

Each of the second shape memory alloy wires may contact a lower surface of the second driving groove in an optical axis direction.

Each of the second driving arms may be aligned with each of the first driving arms in the optical axis direction.

in another general aspect, a camera module includes: a case defining an inner space; a lens module disposed in the inner space; a base disposed on one side of the case; a first moving frame, a second moving frame, and a third moving frame stacked on the base in an optical axis direction; an image sensor mounted on the first moving frame; a first sensor driving portion including a plurality of first frame driving members and a plurality of first shape memory alloy wires disposed outside an edge of the first moving frame and interlocked with each other to drive the first moving frame in a first direction perpendicular to an optical axis; a second sensor driving portion including a plurality of second frame driving members and a plurality of second shape memory alloy wires disposed outside an edge of the second moving frame and interlocked with each other to drive the second moving frame in a second direction perpendicular to the first direction; and a third sensor driving portion including a plurality of third frame driving members and a plurality of third shape memory alloy wires disposed outside an edge of the third moving frame and interlocked with each other to rotatably drive the third moving frame based on the optical axis.

The plurality of first frame driving members may include a pair of first frame driving members, each of the pair of first frame driving members may be disposed diagonally opposite to the second moving frame, the plurality of second frame driving members may include a pair of second frame driving members, each of the pair of second frame driving members may be disposed diagonally opposite to the third moving frame, the plurality of third frame driving members may include a first pair of third frame driving members and a second pair of third frame driving members, each of the first pair of third frame driving members may be disposed diagonally opposite to the base, and each of the second pair of third frame driving members may be disposed diagonally opposite the first pair of third frame driving members with a straight line that passes through the optical axis on the base and parallel to the base as an axis.

in another general aspect, a camera module includes: a case defining an inner space; a lens module disposed in the inner space; a first lens driving member including a first holder disposed to surround a lens module and a plurality of first driving arms disposed on a side of the first holder and extending in all directions perpendicular to an optical axis; a second lens driving member including a second holder disposed to surround the lens module and a plurality of second driving arms disposed on a side of the second holder and extending in all directions perpendicular to the optical axis, and disposed on one side of the first lens driving member along the optical axis; a plurality of first shape memory alloy wires disposed over the plurality of first driving arms and configured to generate a driving force downward parallel to the optical axis; and a plurality of second shape memory alloy wires disposed over the plurality of second driving arms and configured to generate a driving force in an upward direction parallel to the optical axis.

The camera module may include an elastic member disposed between the first lens driving member and the second lens driving member.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
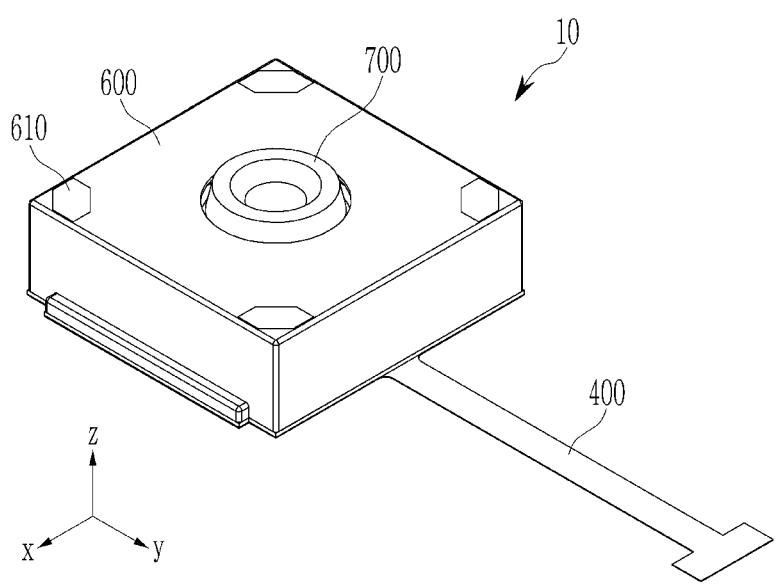
FIG. 1 is a perspective view showing an appearance of a camera module according to a perspective view of an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Herein, "optical axis" may be set as a central axis of a lens perpendicular to a lens surface for imaging, and "optical axis direction" means a direction that is parallel to the central axis. In the drawings below, the optical axis is set as the z-axis, and the x-axis and y-axis are set as directions that are perpendicular to the optical axis. In this case, the x-axis and the y-axis are perpendicular to each other, and the x-y plane formed by the x-axis and the y-axis becomes a plane that is perpendicular to the optical axis.

Figure 2:
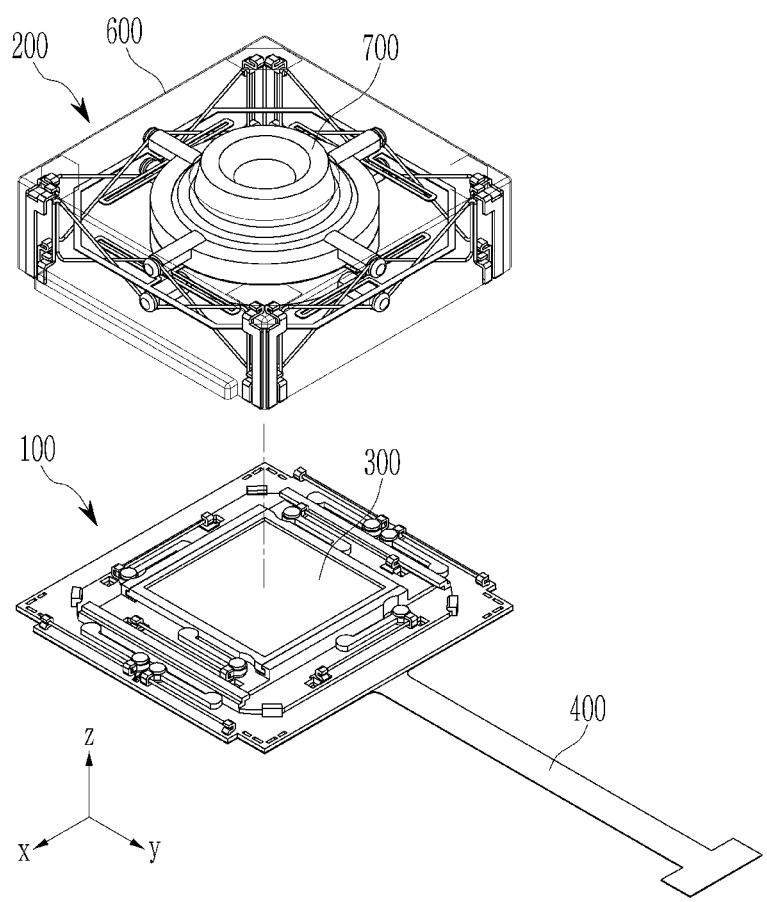
FIG. 2 is a perspective view that shows a first actuator driving an image sensor of the camera module shown in FIG. 1 and a second actuator driving a lens module.

FIG. 1 is a perspective view showing an appearance of a camera module according to a perspective view of an example, and FIG. 2 is a perspective view that shows a first actuator driving an image sensor of the camera module shown in FIG. 1 and a second actuator driving a lens module.

Referring to FIG. 1 and FIG. 2, a camera module 10 may include a case 600 defining an inner space, an image sensor 300 accommodated in the inner space, a first actuator 100 driving the image sensor 300, a second actuator 200 that is disposed in front of the first actuator 100 with reference to a light incident direction and that drives a lens module 700, and a circuit board 400 that is electrically connected with the first actuator 100 and the second actuator 200.

The case 600 may cover the inner space where the first actuator 100 and the second actuator 200 are accommodated. In the case 600, a protecting member 610 covering openings disposed in the four corner regions of one side may be disposed.

The image sensor 300 mounted on the first actuator 100 may be disposed on the circuit board 400 and generate an electrical image signal in response to incident light information. The circuit board 400 may be extended outside the case 600 to transmit the generated image signal to an external circuit, and the circuit board 400 may be a flexible printed circuit board (FPCB). The image sensor 300 may be accommodated in the first actuator 100 and driven in a direction perpendicular to the optical axis for optical image stabilization. In addition, the image sensor 300 may be rotated based on an optical axis within the first actuator 100.

The lens module 700 may include a lens barrel having a plurality of lenses for imaging an object and a lens holder accommodating the lens barrel. The lens module 700 may be accommodated in the second actuator 200 so as to be able to move the optical axis direction for auto focusing. In addition, the lens module 700 may be rotated on the basis of the x-axis or the y-axis within the second actuator 200, and may be tilted on the basis of the optical axis by adjusting the degree of rotation on the x-axis and y-axis.

Hereinafter, referring to FIG. 3 to FIG. 8, the first actuator 100 according to an example will be described.

Figure 3:
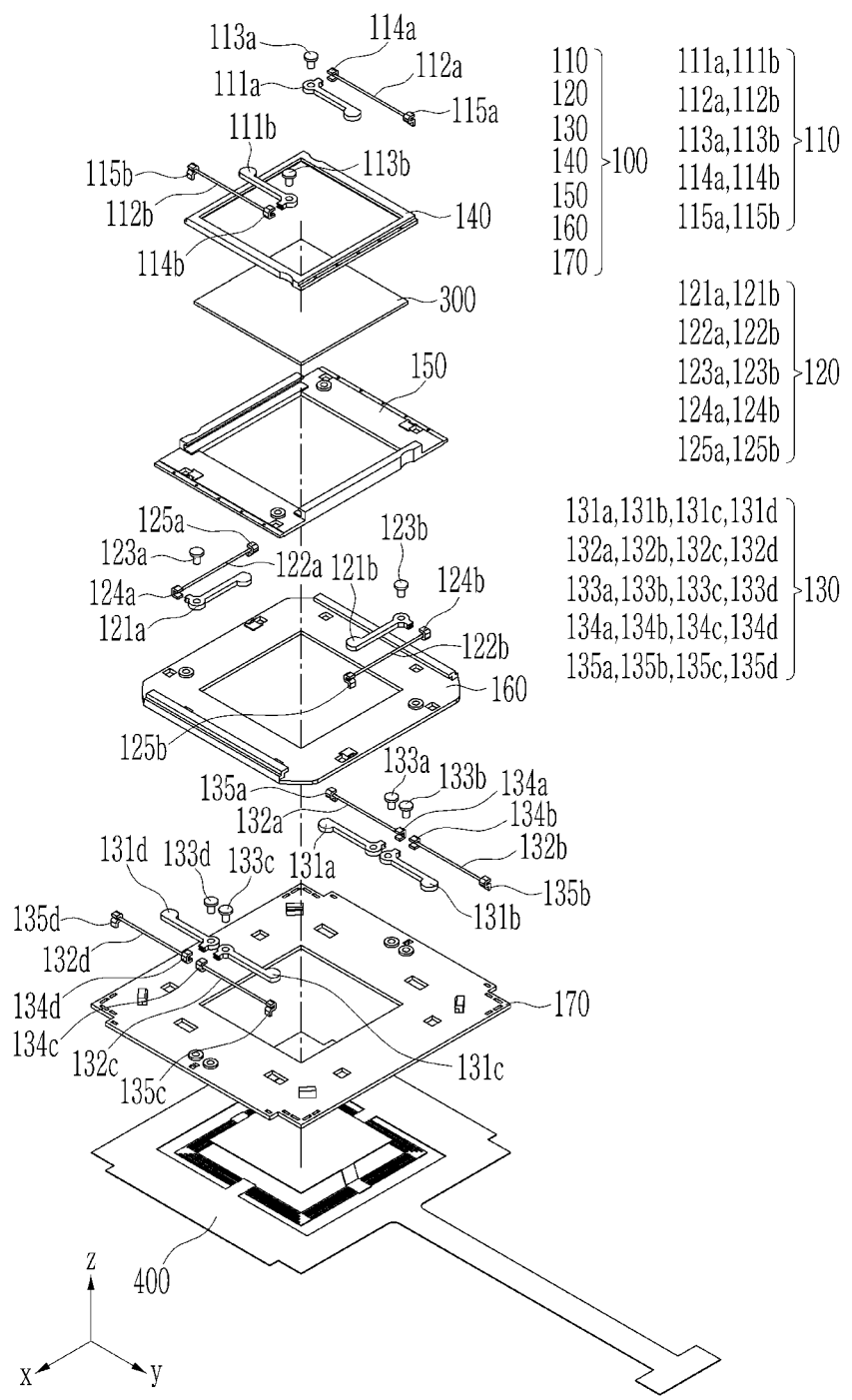
FIG. 3 is an exploded perspective view of the first actuator shown in FIG. 2.

FIG. 3 is an exploded perspective view of the first actuator shown in FIG. 2.

Referring to FIG. 3, first actuator 100 may include a base 170, first, second, and third moving frames 140, 150, and 160, an image sensor 300, a first sensor driving portion 110, a second sensor driving portion 120, and a third sensor driving portion 130.

The first, second, and third moving frames 140, 150, and 160 may be stacked and disposed in the optical axis direction on the base 170. The image sensor 300 may be mounted on the first moving frame 140. The first sensor driving portion 110 is disposed outside an edge of the first moving frame 140, and may include a plurality of first frame driving members 111a and 111b interlocking with each other to drive the first moving frame 140 in a first direction that is perpendicular to the optical axis direction (e.g., x-axis direction), and a plurality of first shape memory alloy wires 112a, and 112b. The second sensor driving portion 120 is disposed outside an edge of the second moving frame 150, and may include a plurality of the second frame driving members 122a and 122b interlocking with each other to drive the second moving frame 150 in a second direction (e.g., y-axis direction) that is perpendicular to both the optical axis direction and the first direction, and a plurality of second shape memory alloy wires 122a and 122b. The third sensor driving portion 130 is disposed outside an edge of the third moving frame 160, and may include a plurality of third frame driving members 131a, 131b, 131c, and 131d interlocking with each other to drive rotation of the third moving frame 160 based on the optical axis, and a plurality of third shape memory alloy wires 132a, 132b, 132c, and 132d. The base 170 may be disposed on the circuit board 400.

Hereinafter, referring to FIG. 4A to FIG. 4E, the first sensor driving portion 110 will be described.

Figure 4A:
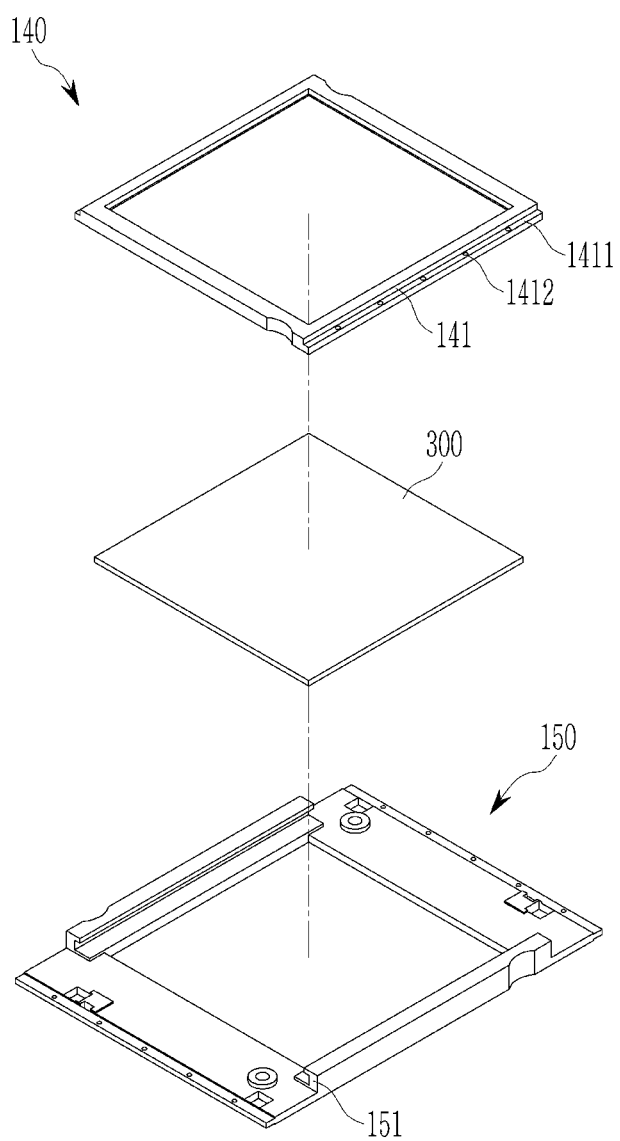
FIG. 4A, FIG. 4B, FIG. 4D, and FIG. 4E are perspective views of assembling of the first sensor driving portion.
Figure 4B:
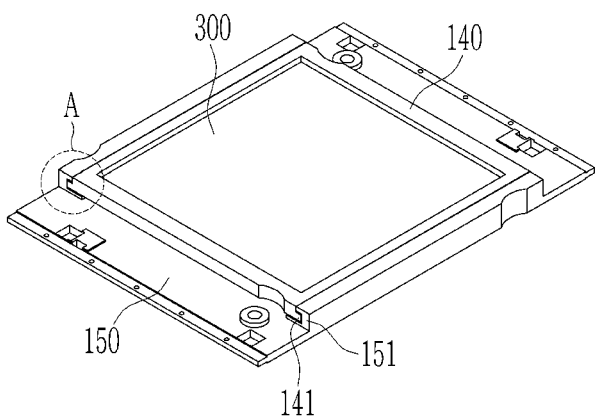
Figure 4C:
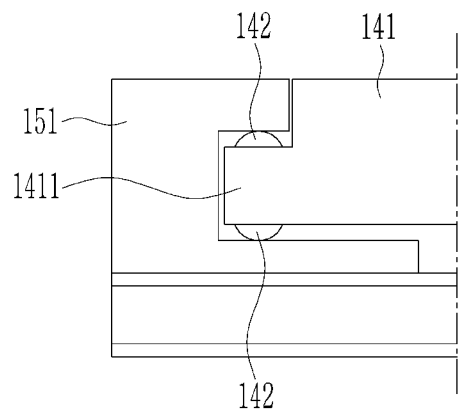
FIG. 4C shows the region A in FIG. 4B viewed from the x-axis direction.

FIG. 4A, FIG. 4B, FIG. 4D, and FIG. 4E are perspective views of assembling of the first sensor driving portion, and FIG. 4C shows the region A in FIG. 4B viewed from the x-axis direction.

Referring to FIG. 4A to FIG. 4C, the image sensor 300 is mounted on the first moving frame 140, and the first moving frame 140 to which the image sensor 300 is mounted may be disposed on the second moving frame 150.

The first moving frame 140 has a central opening for mounting the image sensor 300 and may have a substantially quadrangular planar shape. A first stepped portion 141 may be disposed on opposite sides of the first moving frame 140. The first stepped portion 141 may extend along both sides of the first moving frame 140. The first stepped portion 141 may be formed in a shape that is drawn upward by a predetermined distance from the outermost edge of the first moving frame 140 toward the center. The first stepped portion 141 may include a protruding end portion 1411 that is relatively protruded from the rest of the first stepped portion 141 and has a plane that is perpendicular to the optical axis. A plurality of first grooves 1412 for inserting a plurality of first rolling members 142 may be disposed on both surfaces of the protruding end portion 1411 facing in the optical axis direction. The first rolling member 142 may be formed in a ball shape. A groove having a shape corresponding to the plurality of first frame driving members 111a and 111b may be disposed on both sides of the first moving frame 140 on which the first stepped portion 141 is not disposed.

The second moving frame 150 has a central opening for connecting the image sensor 300 and the circuit board 400 and may have a substantially quadrangular planar shape. A second step portion 151 may be disposed on opposite sides of the second moving frame 150. The second stepped portion 151 may extend along inner edges of both sides of the second moving frame 150. The second stepped portion 151 may be formed in a shape that is raised upward and drawn a predetermined distance outward from an inner edge of the second moving frame 150. The second stepped portion 151 may have a shape that is complementary to that of the first stepped portion 141. In addition, a groove having a shape corresponding to a portion of each of the plurality of second frame driving members 121a and 121b may be disposed in the second stepped portion 151.

The second stepped portion 151 and the first stepped portion 141 may be engaged and combined with each other. For example, as shown in FIG. 4C, the protruding end portion 1411 may be combined with the second stepped portion 151, while having a distance therebetween. The first rolling member 142 may be interposed above and below the protruding end portion 1411 of the first stepped portion 141 and the second stepped portion 151 to enable the first rolling member 142 to smoothly move while maintaining a distance therebetween. That is, a height exposed in the optical axis direction of the first rolling member 142 may be equal to a separation distance in the optical axis direction between one surface of the protruding end portion 1411 and one surface of the second stepped portion 151 facing the protruding end portion 1411. Accordingly, when force is applied to the first moving frame 140, the plurality of first rolling members 142 may rotate and the first moving frame 140 may move in the first direction.

Figure 4D:
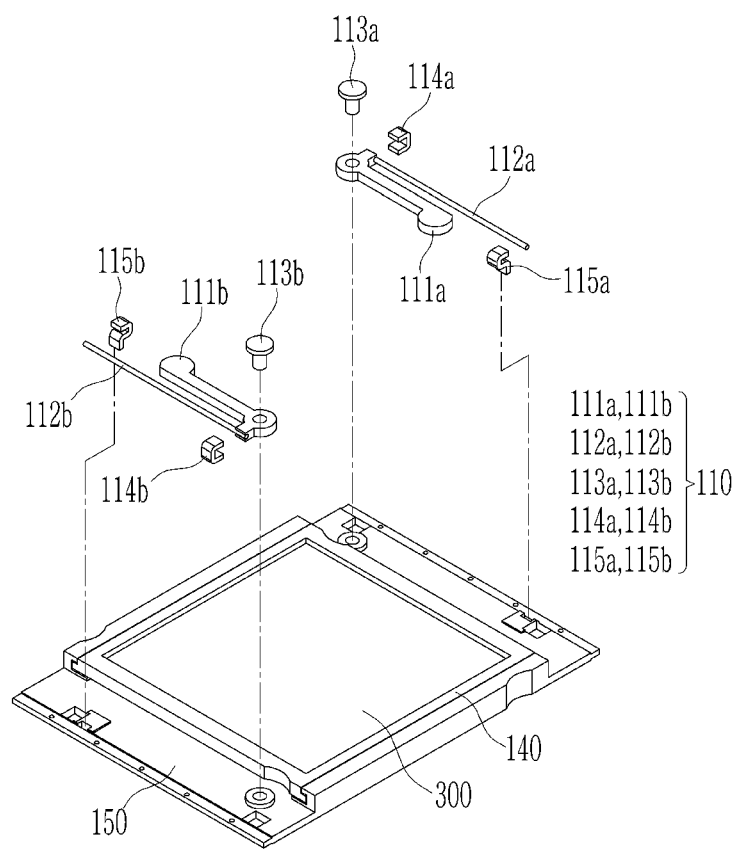
Figure 4E:
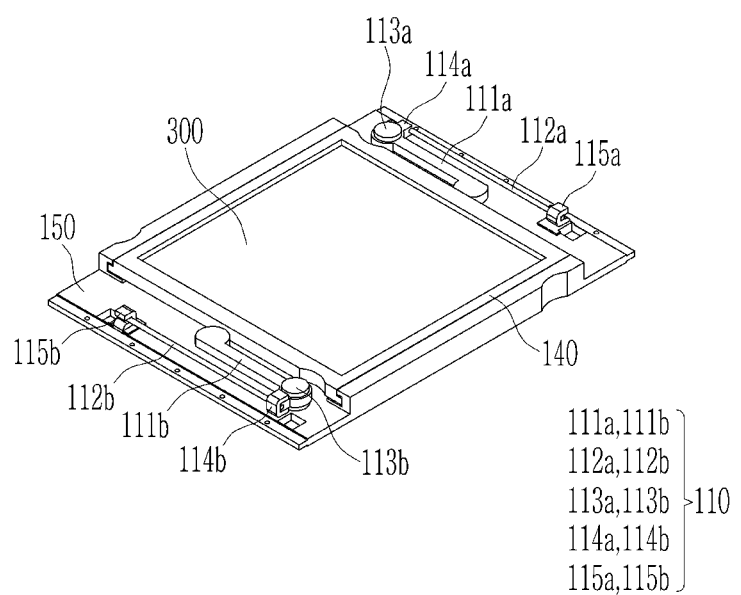

Referring to FIG. 4D and FIG. 4E, the first sensor driving portion 110 may include the plurality of first frame driving members 111a and 111b, a plurality of first shape memory alloy wires 112a and 112b, a plurality of first shafts 113a and 113b, a plurality of first connection members 114a and 114b, and a plurality of first fixing members 115a and 115b. The first sensor driving portion 110 may be disposed on both sides where expansion portions 152 of the second moving frame 150 are disposed while facing each other.

Each of the plurality of first frame driving members 111a and 111b may be disposed on the second moving frame 150. One end of each of the plurality of first frame driving members 111a and 111b may be fixed to be rotatable at one outside corner of the first moving frame 140, and the other end of each of the plurality of first frame driving members 111a and 111b may be disposed to be adjacent to an edge of the first moving frame 140. A hole for insertion of the first shafts 113a and 113b may be formed in an end of each of the plurality of first frame driving members 111a and 111b, and the other end may have an extended shape to contact the first moving frame 140. For example, the plurality of first frame driving members 111a and 111b may include a pair of first frame driving members 111a and 111b, and each of the pair of first frame driving members 111a and 111b may be disposed on the diagonally opposite side of the second moving frame 150.

Each of the plurality of first frame driving members 111a and 111b may be connected to each of the plurality of first shape memory alloy (SMA) wires 112a and 112b. Each of the plurality of first shape memory alloy wires 112a and 112b may be coupled to one end of each of the plurality of first frame driving members 111a and 111b to provide rotation driving force. Each of the plurality of first SMA wires 112a and 112b may be inserted into grooves disposed in each of the plurality of first frame driving members 111a and 111b and fixed through the first connection members 114a and 114b. Each of the plurality of first SMA wires 112a and 112b may extend along an inner edge of the second moving frame 150. For example, the plurality of first SMA wires 112a and 112b may include a pair of first SMA wires 112a and 112b, and each of the pair of first SMA wires 112a and 112b may be coupled to the first frame driving members 111a and 111b through the first connection members 114a and 114b and disposed on the diagonally opposite sides of the second moving frame 150.

Each of the plurality of first shafts 113a and 113b may be inserted into a hole disposed at one end of each of the plurality of first frame driving members 111a and 111b. Each of the plurality of first shafts 113a and 113b may be inserted together into the plurality of first frame driving members 111a and 111b and the second moving frame 150. Therefore, each of the plurality of first frame driving members 111a and 111b is limited in movement of the optical axis direction, and may rotate in a direction that is perpendicular to the optical axis with the first shaft 113a and 113b as an axis according to the contraction of the first shape memory alloy wires 112a and 112b. For example, the plurality of first shafts 113a and 113b may include a pair of first shafts 113a and 113b, and each of the pair of first shafts 113a and 113b is disposed diagonally opposite to a corner region of the second moving frame 150.

One end of each of the plurality of first shape memory alloy wires 112a and 112b may be fixed to a side surface of each of the plurality of first frame driving members 111a and 111b through a plurality of first connection members 114a and 114b. Each of the plurality of first connection members 114a and 114b may have a clamp shape. Each of the plurality of first connection members 114a and 114b may include a conductive terminal and be electrically connected to the circuit board 400 through wiring portions 501 and 502 (refer to FIG. 7C). For example, the plurality of first connection members 114a and 114b may include a pair of first connection members 114a and 114b, and each of the pair of first connection members 114a and 114b may be disposed diagonally opposite to the second moving frame 150.

The other end of each of the plurality of first shape memory alloy wires 112a and 112b may be fixed on the second moving frame 150 through a plurality of first fixing members 115a and 115b. Each of the plurality of first fixing members 115a and 115b may have a clamp shape. Each of the plurality of first fixing members 115a and 115b may include a conductive terminal and be electrically connected to the circuit board 400 through wiring portions 503 and 504 (see FIG. 7C). For example, the plurality of first fixing members 115a and 115b may include a pair of first fixing members 115a and 115b, and each of the pair of first fixing members 115a and 115b may be disposed diagonally opposite to the second moving frame 150.

In the first sensor driving portion 110, at least one of the plurality of first shape memory alloy wires 112a and 112b shrinks according to an electrical signal input such that at least one of the plurality of first frame driving members and 111a and 111b connected thereto may be rotated in a direction that is perpendicular to the optical axis. Accordingly, a driving force in the first direction is applied to at least one side of the first moving frame 140, and the first moving frame 140 can be driven in the first direction.

Hereinafter, referring to FIG. 5A to FIG. 5E, the second sensor driving portion 120 will be described.

Figure 5A:
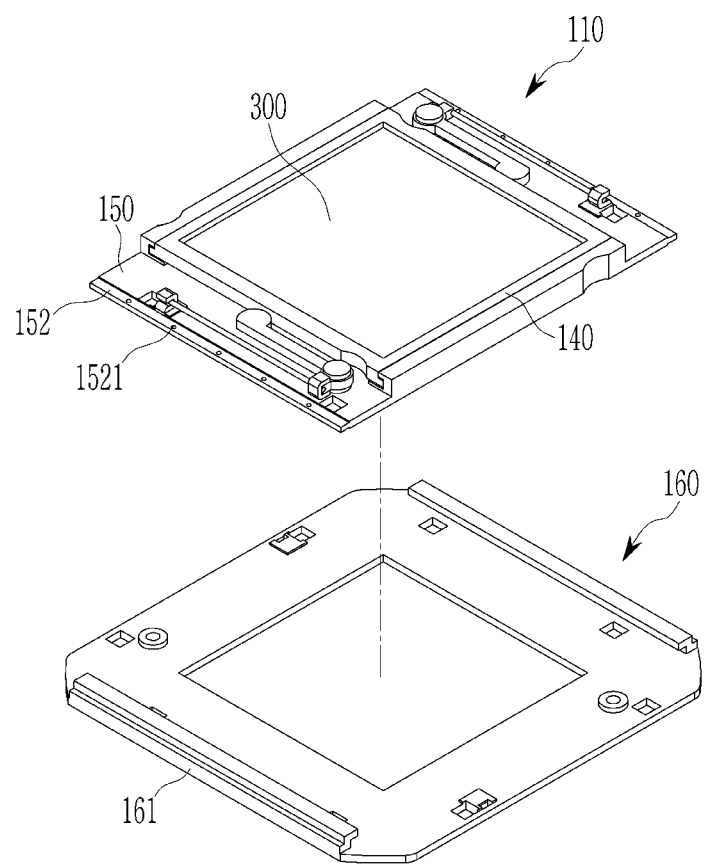
FIG. 5A, FIG. 5B, FIG. 5D, FIG. 5E are perspective views of an assembling process of the second sensor driving portion.
Figure 5B:
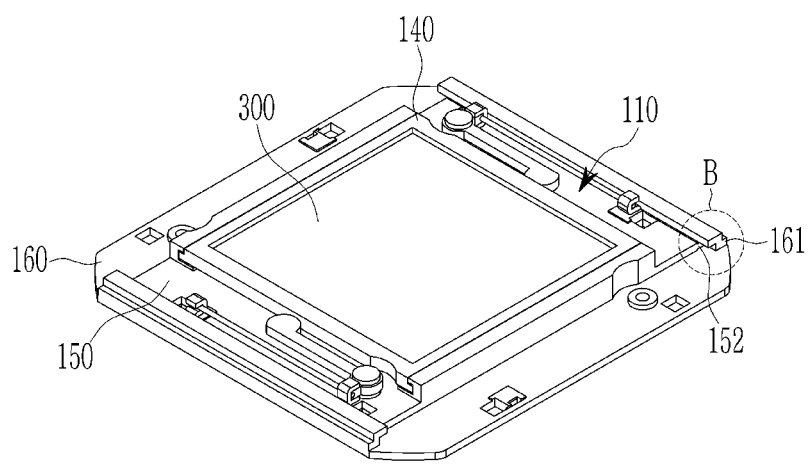
Figure 5C:
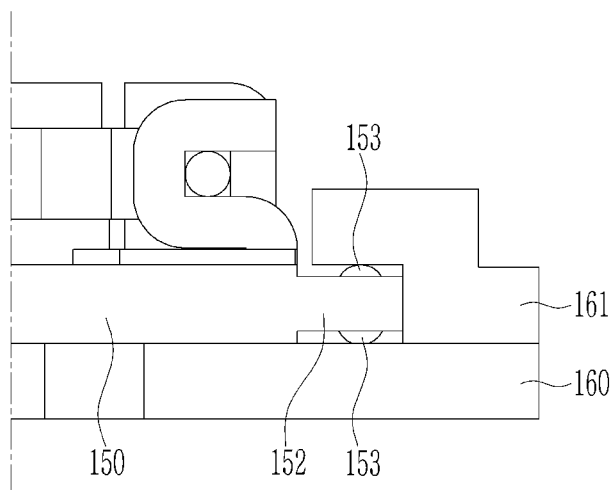
FIG. 5C is a top plan view of the region B of FIG. 5B viewed from the y-axis direction.

FIG. 5A, FIG. 5B, FIG. 5D, and FIG. 5E are perspective views of an assembling process of the second sensor driving portion, and FIG. 5C is a top plan view of the region B of FIG. 5B viewed from the y-axis direction.

Referring to FIG. 5A to FIG. 5C, the second moving frame 150 in which the first moving frame 140 is combined and the first sensor driving portion 110 is disposed may be disposed on the third moving frame 160.

The expansion portion 152 may be disposed on both sides of the second moving frame 150 on which the second stepped portion 151 is not positioned. The expansion portion 152 may extend along both sides where the second stepped portion 151 of the second moving frame 150 is not positioned. A plurality of second grooves 1521 for inserting a plurality of second rolling member 153 may be disposed on both surfaces of the expansion portion 152 facing the optical axis direction. The second rolling member 153 may be formed in a ball shape.

The third moving frame 160 has a central opening for connecting the image sensor 300 and the circuit board 400 and may have a substantially quadrangular planar shape. The four corner regions of the third moving frame 160 may have a gently inclined shape in the form of a curved line. A third stepped portion 161 may be disposed on opposite sides of the third moving frame 160. The third stepped portion 161 may extend along both sides of the third moving frame 160. The third stepped portion 161 may be formed in a shape that is raised upward and drawn a predetermined distance outward from an inner edge of the third moving frame 160. The expansion portion 152 of the second moving frame 150 may be inserted into a space where the third stepped portion 161 is inserted.

The third stepped portion 161 and the expansion portion 152 may be engaged and coupled to each other. For example, as shown in FIG. 5C, the expansion portion 152 may be combined with the third stepped portion 161 through the retracted space of the third stepped portion 161 while being spaced apart from the third stepped portion 161 with a distance therebetween. Between the expansion portion 152 and the third stepped portion 161, a second rolling member 153 may be interposed above and below the expansion portion 152 to enable smooth movement while maintaining a gap. The second rolling member 153 inserted into the second groove 1521 of the expansion portion 152 may contact one surface of the third moving frame 160, and may specifically contact the third stepped portion 161. That is, a height exposed in the optical axis direction of the second rolling member 153 may be equal to the separation distance in the optical axis direction between one surface of the expansion portion 152 and one surface of the third stepped portion 161 facing the expansion portion 152. Accordingly, when force is applied to the second moving frame 150, a plurality of second rolling members 153 may rotate and the second moving frame 150 may move in the second direction.

Figure 5D:
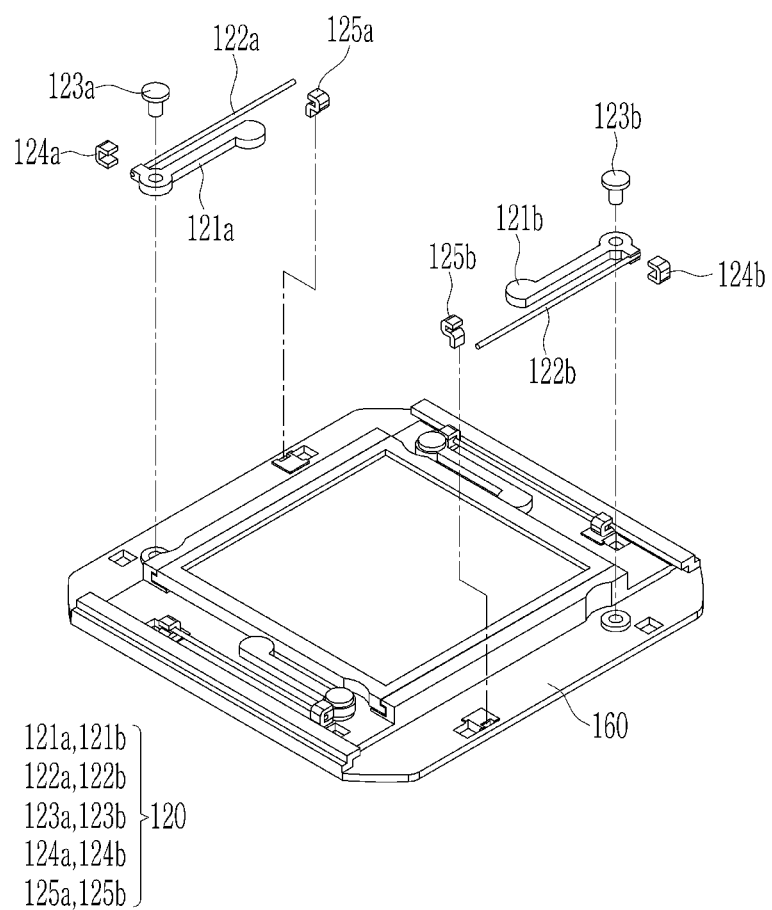
Figure 5E:
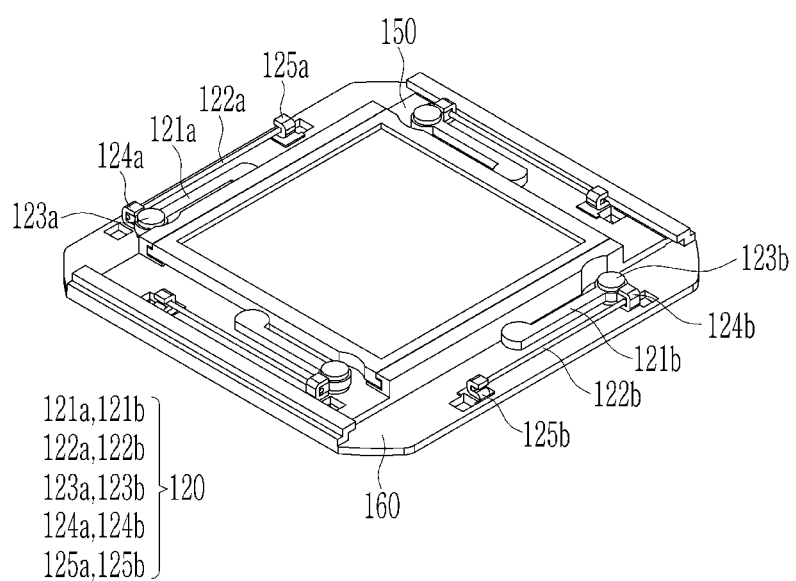

Referring to FIG. 5D and FIG. 5E, the second sensor driving portion 120 may include a plurality of second frame driving members 121a and 121b, a plurality of second shape memory alloy wires 122a and 122b, a plurality of second shafts 123a and 123b, a plurality of second connection members 124a and 124b, and a plurality of second fixing members 125a and 125b. In the second sensor driving portion 120, the third stepped portion 161 of the third moving frame 160 is not disposed and may be disposed on both opposite sides.

Each of the plurality of second frame driving members 121a and 121b may be disposed on a third moving frame 160. One end of each of the plurality of second frame driving members 121a and 121b may be fixed to be rotatable outside one corner of the second moving frame 150, and the other end of each of the plurality of second frame driving members 121a and 121b may be disposed to be in contact with an edge of the second moving frame 150. A hole may be disposed in each of the plurality of second frame driving members 121a and 121b for insertion of the second shafts 123a and 123b, and the other end may have an extended shape so as to contact the second moving frame 150. For example, the plurality of second frame driving members 121a and 121b may include a pair of second frame driving members 121a and 121b, and each of the pair of second frame driving members 121a and 121b may be disposed diagonally opposite to the third moving frame 160.

Each of the plurality of second frame driving members 121a and 121b may be connected to each of the plurality of second shape memory alloy wires 122a and 122b. Each of the plurality of second shape memory alloy wires 122a and 122b may be coupled to one end of each of the plurality of second frame driving members 121a and 121b to provide rotation driving force. Each of the plurality of second shape memory alloy wires 122a and 122b may be inserted into a groove disposed in each of the plurality of second frame driving members 121a and 121b and fixed through second connection members 124a and 124b. Each of the plurality of second shape memory alloy wires 122a and 122b may extend along one edge of the third moving frame 160. For example, the plurality of second shape memory alloy wires 122a and 122b may include a pair of second shape memory alloy wires 122a and 122b, and each of the pair of second shape memory alloy wires 122a and 122b is the second shape memory alloy wire 122a and 122b. It can be combined with the second frame driving members 121a and 121b through the second connection members 124a and 124b and disposed on the diagonally opposite side of the third moving frame 160.

Each of the plurality of second shafts 123a and 123b may be inserted into a hole disposed at one end of each of the plurality of second frame driving members 121a and 121b. Each of the plurality of second shafts 123a and 123b may be inserted into the plurality of second frame driving members 121a and 121b and the third moving frame 160. Therefore, each of the plurality of second frame driving members 121a and 121b is limited in the movement of the optical axis direction, and may rotate in a direction that is perpendicular to the optical axis with the second shafts 123a and 123b as an axis according to the contraction of the second shape memory alloy wires 122a and 122b. For example, the plurality of second shafts 123a and 123b may include a pair of first shafts 123a and 123b, and each of the pair of second shafts 123a and 123b may be diagonally opposite to a corner region of the third moving frame 160.

One end of each of the plurality of second shape memory alloy wires 122a and 122b may be fixed to a side surface of each of the plurality of second frame driving members 121a and 121b through a plurality of second connection members 124a and 124b. Each of the plurality of second connection members 124a and 124b may have a clamp shape. Each of the plurality of second connection members 124a and 124b may include a conductive terminal and be electrically connected to the circuit board 400 through wiring portions 505 and 506 (see FIG. 7C). For example, the plurality of second connection members 124a and 124b may include a pair of second connection members 124a and 124b, and each of the pair of second connection members 124a and 124b may be disposed diagonally opposite to the second moving frame 150.

The other ends of each of the plurality of second shape memory alloy wires 122a and 122b may be fixed on the third moving frame 160 through the plurality of second fixing members 125a and 125b. Each of the plurality of second fixing members 125a and 125b may have a clamp shape. Each of the plurality of second fixing members 125a and 125b may include a conductive terminal and be electrically connected to the circuit board 400 through wiring portions 507 and 508 (see FIG. 7C). For example, the plurality of second fixing members 125a and 125b may include a pair of second fixing members 125a and 125b, and each of the pair of second fixing members 125a and 125b may be disposed diagonally opposite to the third moving frame 160.

In the second sensor driving portion 120, at least one of the plurality of second shape memory alloy wires 122a and 122b shrinks according to an electrical signal input such that at least one of the plurality of second frame driving members and 121a and 121b connected thereto may be rotated in a direction that is perpendicular to the optical axis. Accordingly, a driving force in the second direction is applied to at least one side of the second moving frame 150, and the second moving frame 150 can be driven in the second direction.

Hereinafter, referring to FIG. 6A to FIG. 6D, the third sensor driving portion 130 will be described.

FIG. 6A to FIG. 6D are perspective views of an assembling process of the third sensor driving portion.

Figure 6A:
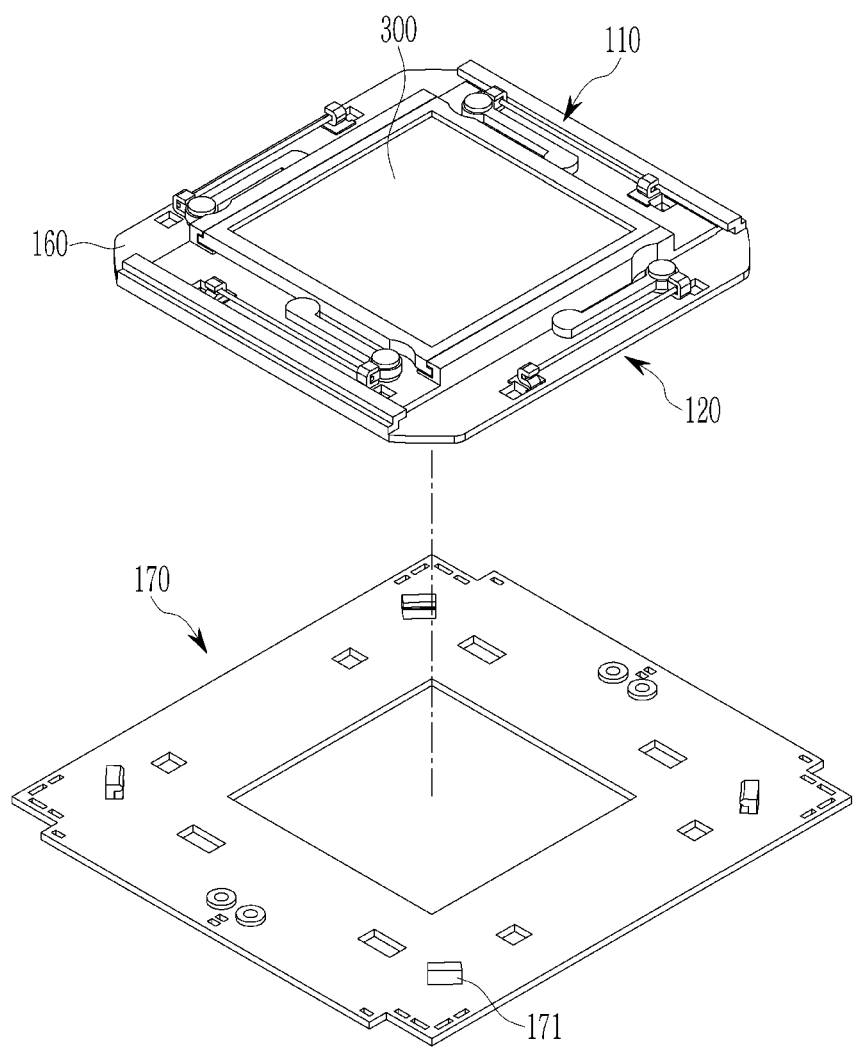
FIG. 6A, 6B, 6C, and FIG. 6D are perspective views of an assembling process of the third sensor driving portion.
Figure 6B:
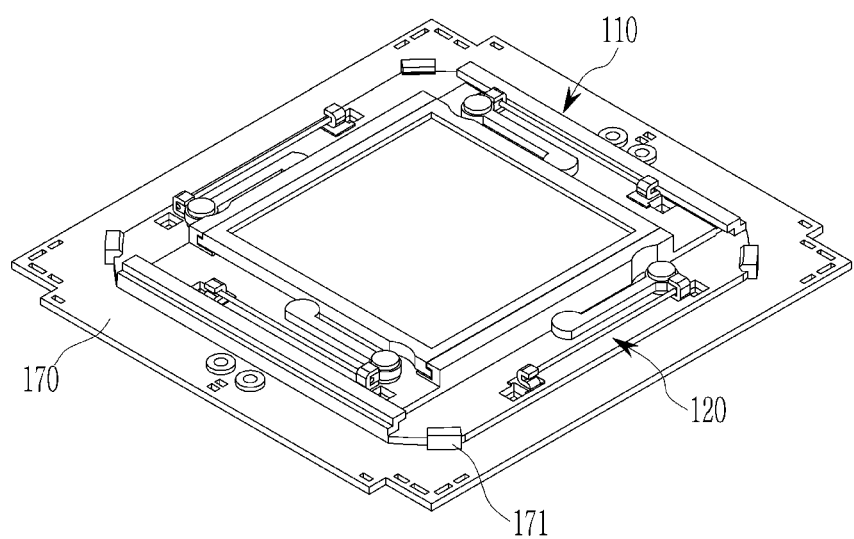
Figure 6C:
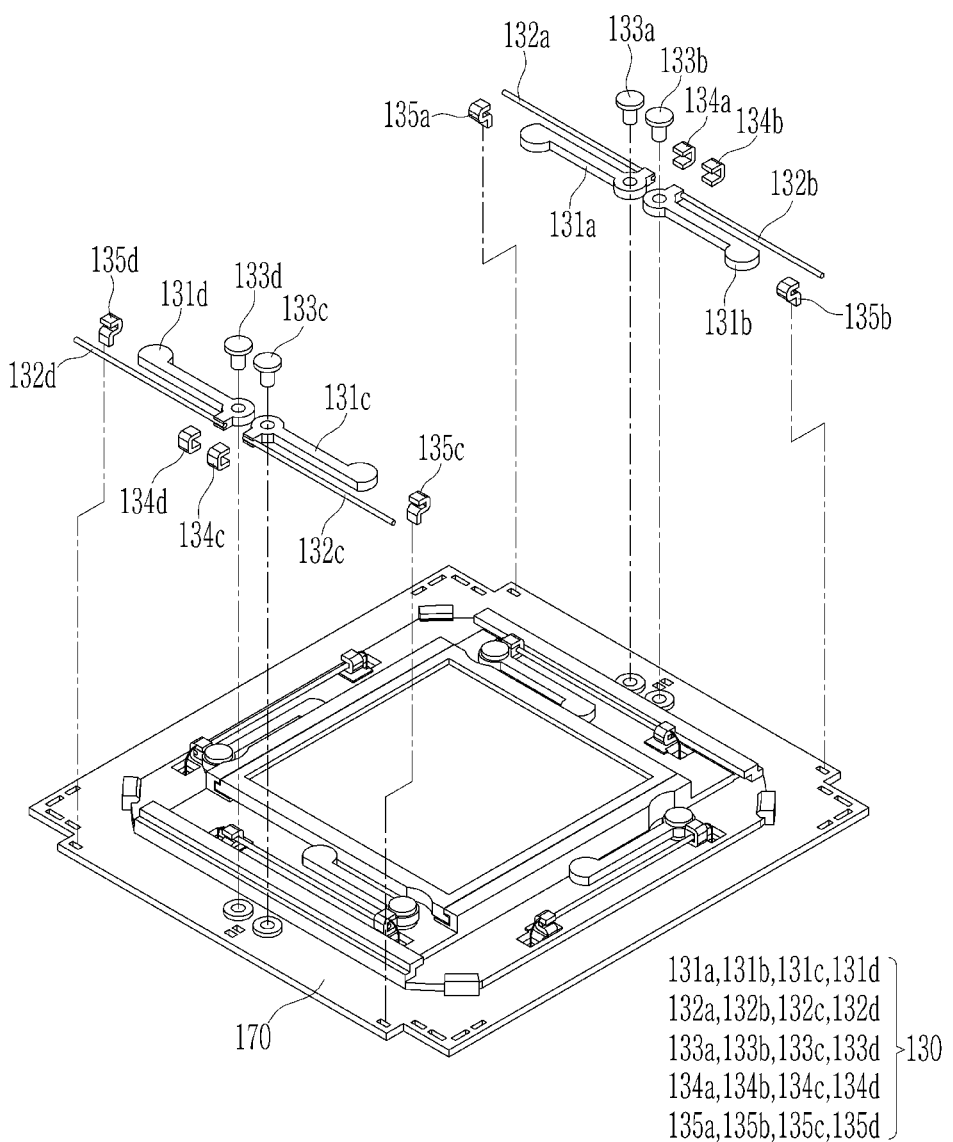

Referring to FIG. 6A to FIG. 6C, the third moving frame 160, in which the second moving frame 150 combined with the first moving frame 140 is combined and the second sensor driving portion 120 is disposed, may be disposed on the base 170.

The base 170 has a central opening for connecting the image sensor 300 and the circuit board 400, and may have a substantially quadrangular planar shape. A guide member 171 may be disposed in a region where the four corners of the third moving frame 160 of the base 170 are disposed. The guide member 171 may extend along an inclined edge of the third moving frame 160. The guide member 171 is raised upward, and an upper surface of the guide member 171 may extend in a center direction of the base 170. That is, the guide member 171 may be protruded on the base 170 and bent toward the center. The third moving frame 160 may be inserted into a space into which the guide member 171 is inserted, and thus a driving range of the third moving frame 160 may be limited by the guide member 171. When force is applied to the third moving frame 160, the third moving frame 160 may rotate while contacting the guide member 171.

Figure 6D:
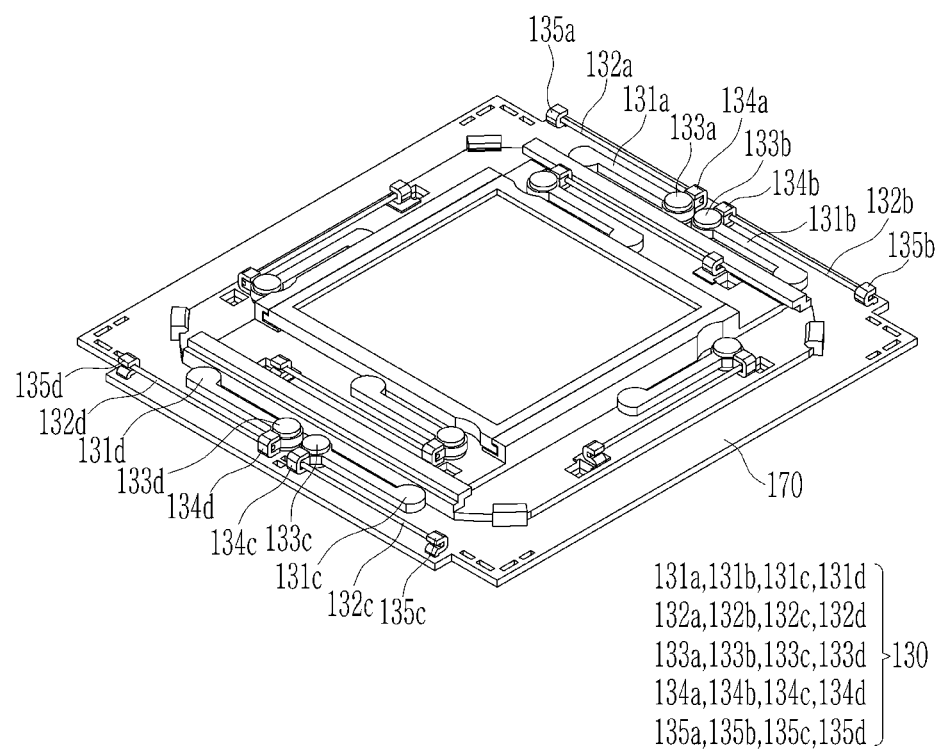

Referring to FIG. 6C and FIG. 6D, the third sensor driving portion 130 may include a plurality of third frame driving members 131a, 131b, 131c, and 131d, a plurality of third shape memory alloy wires 132a, 132b, 132c, and 132d, a plurality of third shafts 133a, 133b, 133c, and 133d, a plurality of third connection members 134a, 134b, 134c, and 134d, and a plurality of third fixing members 135a, 135b, 135c, and 135d. The third sensor driving portion 130 may be disposed on opposite sides of the base 170.

Each of the plurality of third frame driving members 131a, 131b, 131c, and 131d may be disposed on the base 170. One end of each of the plurality of third frame driving members 131a, 131b, 131c, and 131d may be fixed to be rotatable at an edge of the third moving frame 160, and the other end of each of the plurality of third frame driving members 131a, 131b, 131c, and 131 may be disposed to contact the outside of one corner of the third moving frame 160. A hole for insertion of the third shafts 133a, 133b, 133c, and 133d may be disposed in one end of each of the plurality of third frame driving members 131a, 131b, 131c, and 131d, and the other ends of the third frame driving members 1311, 131b, 131c, and 131d may have a shape extended to contact the third moving frame 160. For example, the plurality of third frame driving members 131a, 131b, 131c, and 131d may include a pair of third frame driving members 131a and 131c and another pair of third frame driving members 131b and 131d. Each of the pair of third frame driving members 131a and 131c may be disposed diagonally opposite to the base 170. Each of the other pair of third frame driving members 131b and 131d may be disposed in symmetry with the pair of third frame driving members 131a and 131c along a straight line passing through the optical axis on the base 170 and parallel to the base 170. That is, each of the other pair of third frame driving members 131b and 131d may be disposed on the opposite side of the diagonal of the base 170.

Each of the plurality of third frame driving members 131a, 131b, 131c, and 131d may be connected to each of the plurality of third shape memory alloy wires 132a, 132b, 132c, and 132d. Each of the plurality of third shape memory alloy wires 132a, 132b, 132c, and 132d is coupled to one end of each of the plurality of third frame driving members 131a, 131b, 131c, and 131d to provide rotation driving force. Each of the plurality of third shape memory alloy wires 132a, 132b, 132c, and 132d is inserted into a groove disposed in each of the plurality of third frame driving members 131a, 131b, 131c, and 131d so as to be fixed through the third connection members 134a, 134b, 134c, and 134d. Each of the plurality of third shape memory alloy wires 132a, 132b, 132c, and 132d may extend along one edge of the base 170. For example, the plurality of third shape memory alloy wires 132a, 132b, 132c, and 132d include a pair of third shape memory alloy wires 132a and 132c and another pair of third shape memory alloy wires 132b and 132d. The pair of third shape memory alloy wires 132a and 132c each may be disposed on the diagonal opposite side of the base 170. The other pair of third shape memory alloy wires 132b and 132d may each be disposed symmetrically with the pair of third shape memory alloy wires 132a and 132c in a straight line passing through the optical axis on the base 170 and parallel to the base 170. That is, each of the other pair of third shape memory alloy wires 132b and 132d may be disposed on the diagonally opposite side of the base 170.

Each of the plurality of third shafts 133a, 133b, 133c, and 133d may be inserted into a hole disposed at one end of each of the plurality of third frame driving members 131a, 131b, 131c, and 131d. Each of the plurality of third shafts 133a, 133b, 133c, and 133d may be inserted together into the plurality of third frame driving members 131a, 131b, 131c, and 131d and the base 170. Therefore, each of the plurality of third frame driving members 131a, 131b, 131c, and 131d is limited in movement in the optical axis direction, and according to the contraction of the third shape memory alloy wires 132a, 132b, 132c, and 132d, the third frame driving members 131a, 131b, 131c, and 131d may rotate in a direction that is perpendicular to the optical axis with the third shafts 133a, 133b, 133c, 133d as axes. For example, the plurality of third shafts 133a, 133b, 133c, and 133d may include a pair of third shafts 133a and 133c and another pair of third shafts 133b and 133d. A pair of third shafts 133a, and 133c each may be disposed diagonally opposite to the corner region of the base 170. Each of the other pair of third shafts 133b and 133d may be disposed symmetrically with the pair of third shafts 133a and 133c about a straight line passing through the optical axis on the base 170 and parallel to the base 170. That is, each of the other pair of third shafts 133b and 133d may be disposed diagonally opposite to the remaining edge region of the base 170.

Each end of the plurality of third shape memory alloy wires 132a, 132b, 132c, and 132d may be fixed to each side of the plurality of third frame driving members 131a, 131b, 131c, and 131d through the plurality of third connection members 134a, 134b, 134c, and 134d. Each of the plurality of third connection members 134a, 134b, 134c, and 134d may have a clamp shape. Each of the plurality of third connection members 134a, 134b, 134c, and 134d may include a conductive terminal and may be electrically connected to the circuit board 400 through wiring portions 509, 510, 511, and 512 (see FIG. 7C). For example, the plurality of third connection members 134a, 134b, 134c, and 134d may include a pair of third connection members 134a and 134c and another pair of third connection members 134b and 134d. Each of the pair of third connection members 134a and 134c may be disposed diagonally opposite the base 170. Each of the other pair of third connection members 134b and 134d may be disposed in symmetry with the pair of third connection members 134a and 134c about a straight line passing through the optical axis on the base 170 and parallel to the base 170. That is, each of the other pair of third connection members 134b and 134d may be disposed diagonally opposite to the side of the base 170.

The other ends of the plurality of third shape memory alloy wires 132a, 132b, 132c, and 132d may be fixed on the base 170 through the plurality of third fixing members 135a, 135b, 135c, and 135d. Each of the plurality of third fixing members 135a, 135b, 135c, and 135d may have a clamp shape. Each of the plurality of third fixing members 135a, 135b, 135c, and 135d may include a conductive terminal and may be electrically connected to the circuit board 400 by being inserted through the base 170. For example, the plurality of third fixing members 135a, 135b, 135c, and 135d may include a pair of third fixing members 135a, and 135c and another pair of third fixing members 135b and 135d. The pair of third fixing members 135a and 135c may each be disposed at diagonally opposite sides of the base 170. Each of the other pair of third fixing members 135b and 135*d* may be disposed in symmetry with the pair of third fixing members 135*a* and 135*c* about an axis passing through an optical axis on the base 170 and parallel to the base 170. That is, each of the other pair of third fixing members 135*b* and 135*d* may be disposed on the diagonal opposite sides of the base 170.

In the third sensor driving portion 130, at least one of the plurality of third shape memory alloy wires 132*a*, 132*b*, 132*c*, and 132*d* contracts according to an electrical signal input such that at least one of the third frame driving members 131*a*, 131*b*, 131*c*, and 131*d* connected thereto may be rotated in a direction that is perpendicular to the optical axis. Accordingly, a driving force in a clockwise direction or a counterclockwise direction is applied to at least one side of the third moving frame 160, and the third moving frame 160 can be rotationally driven.

Hereinafter, referring to FIG. 7A to FIG. 7C, an assembling process of the base 170 and the circuit board 400 will be described.

Figure 7A:
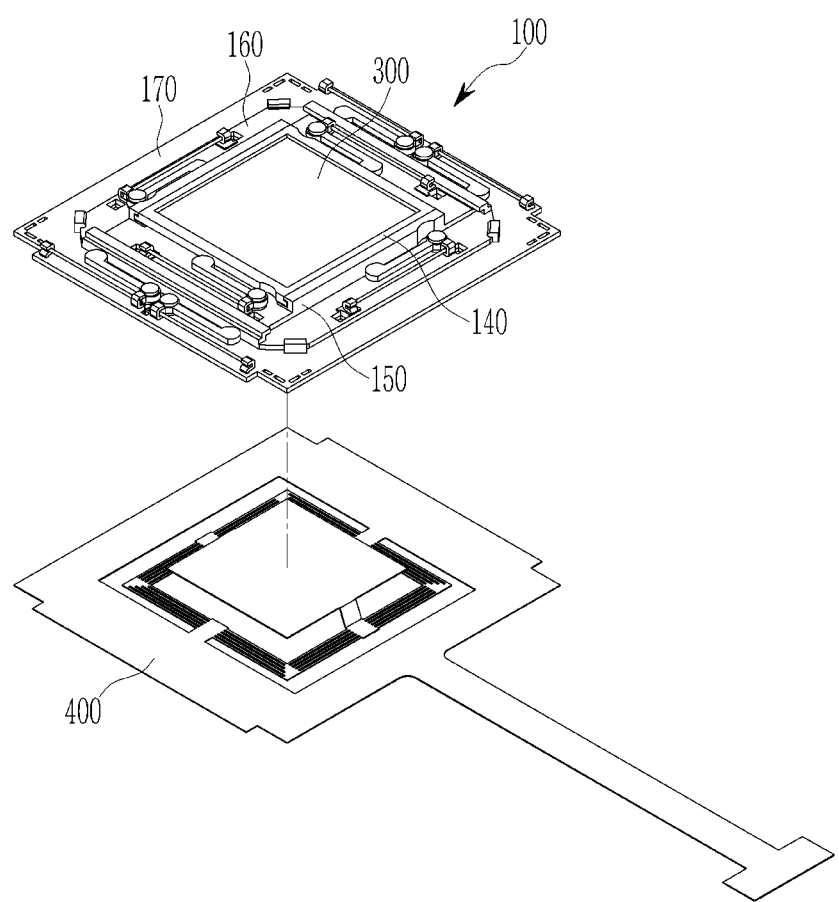
FIG. 7A, 7B, and FIG. 7C are perspective views of a process for assembling the base and the circuit board.
Figure 7B:
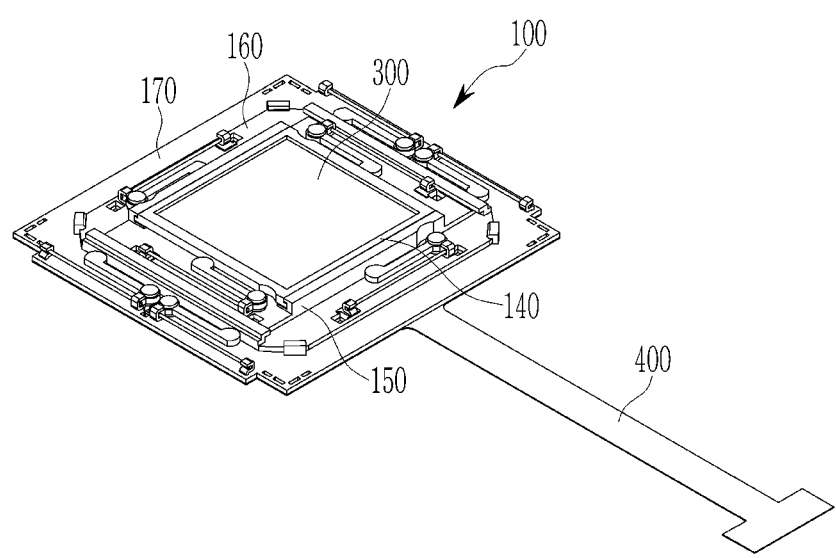
Figure 7C:
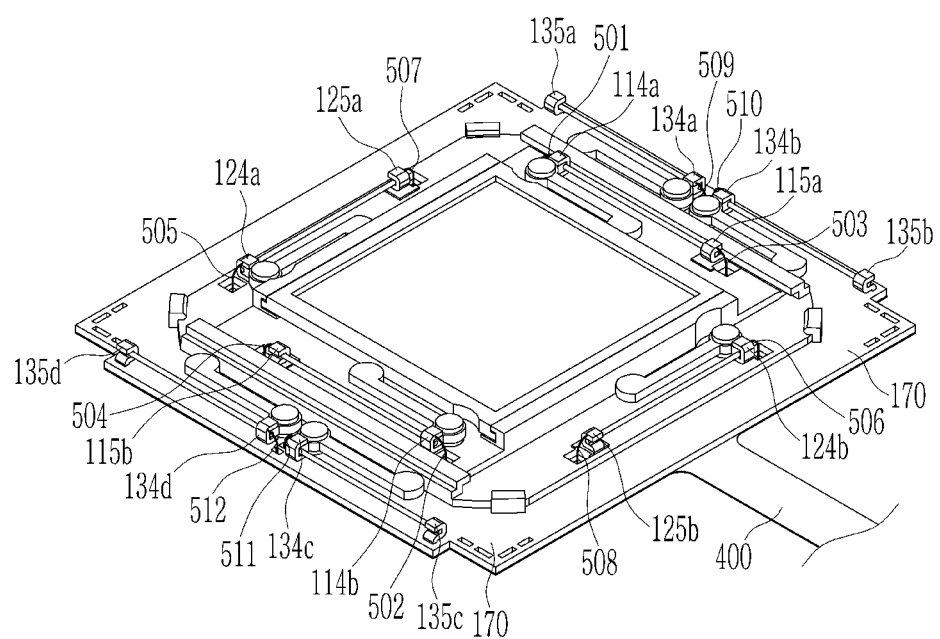

FIG. 7A to FIG. 7C are perspective views of a process for assembling the base and the circuit board.

Referring to FIG. 7A and FIG. 7B, the first to third moving frames 140, 150, and 160 are stacked, and the base 170 where the first to third sensor driving portions 110, 120, and 130 are disposed may be disposed on the circuit board 400. The circuit board 400 may have a shape of which a center is protruded so as to be connected to the image sensor 300 mounted on the first moving frame 140.

Referring to FIG. 7C, the plurality of first connection members 114*a* and 114*b*, the plurality of second connection members 124*a* and 124*b*, the plurality of third connection members 134*a*, 134*b*, 134*c*, and 134*d*, the plurality of first fixing members 115*a* and 115*b*, and the plurality of second fixing member 125*a* and 125*b* may be electrically connected with the circuit board 400 through the wiring portions 501, 502, 503, 504, 505, 506, 507, 508, 509, 510, 511, and 512. The plurality of third fixing members 135*a*, 135*b*, 135*c*, and 135*d* may be inserted through grooves disposed in the base 170. Accordingly, the plurality of third fixing members 135*a*, 135*b*, 135*c*, and 135*d* may be directly connected to the circuit board 400.

Hereinafter, referring to FIG. 8A to FIG. 8E, a driving process of the first actuator 100 will be described.

FIG. 8A to FIG. 8E are top plan views of a driving process of the first actuator.

Figure 8A:
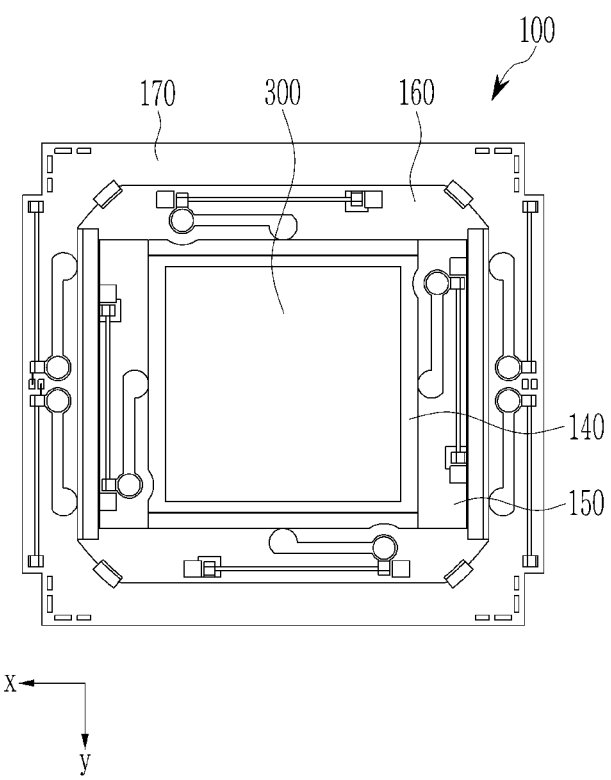
FIG. 8A, 8B, 8C, 8D, and FIG. 8E are top plan views of a driving process of the first actuator.

FIG. 8A shows a state in which an electric signal is not input to the first actuator 100.

Figure 8B:
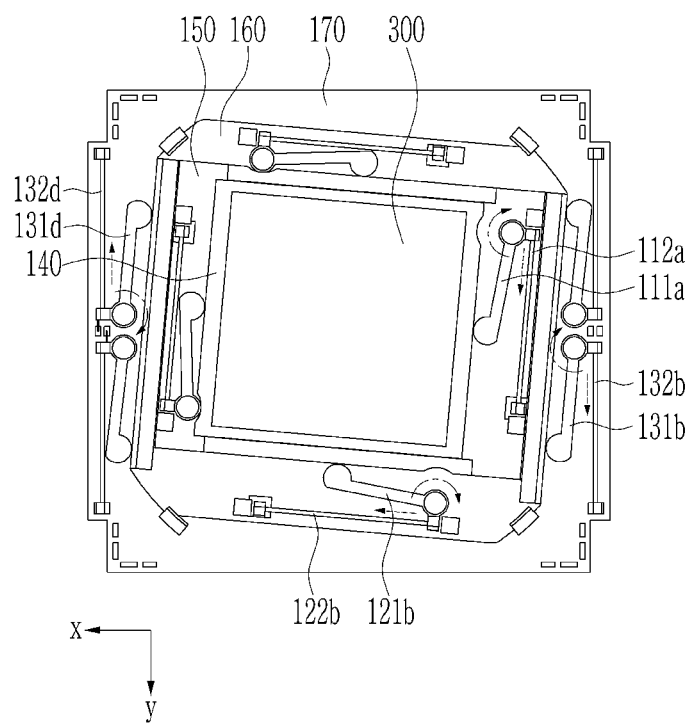

Referring to FIG. 8B, the first shape memory alloy wire 112*a* may contract according to the electrical signal input, and thus the first frame driving member 111*a* connected to the first shape memory alloy wire 112*a* may rotate. In addition, accordingly, the first moving frame 140 can be driven in the first direction.

In addition, the second shape memory alloy wire 122*b* may contract according to an electrical signal input, and thus the second frame driving member 121*b* connected to the second shape memory alloy wire 122*b* may rotate. Accordingly, the second moving frame 150 can be driven in the second direction.

In addition, according to the electrical signal input, another pair of third shape memory alloy wires 132*b* and 132*d* may contract, and thus another pair of third shape memory alloy wires 132*b* and 132*d* connected to the other pair of third frame driving members 131*b* and 131*d* may rotate. Accordingly, the third moving frame 160 may rotate in a clockwise direction.

Accordingly, the image sensor 300 may simultaneously rotate in a counterclockwise direction while moving in a first direction (e.g., x-axis direction) and a second direction (e.g., −y-axis direction).

Figure 8C:
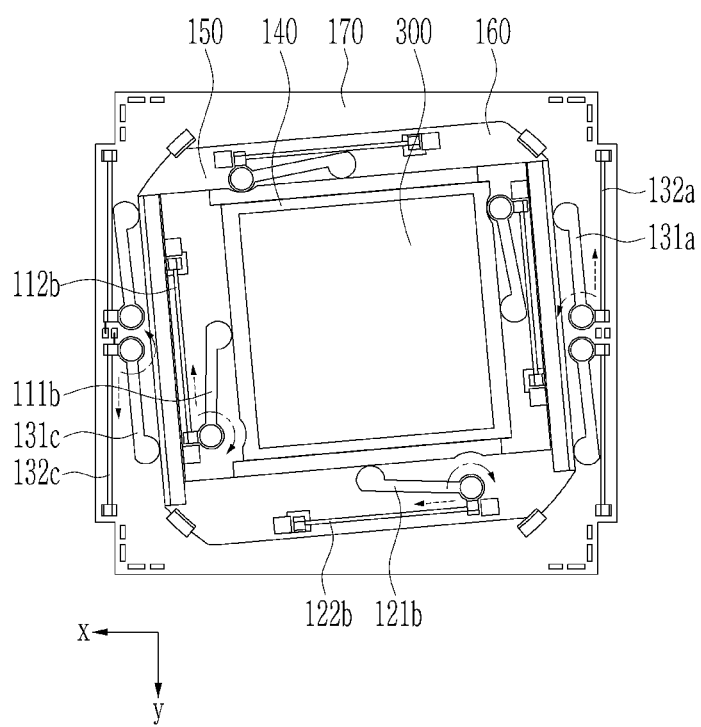

Referring to FIG. 8C, the first shape memory alloy wire 112*b* may contract according to the electric signal input, and thus the first frame driving member 111*b* connected to the first shape memory alloy wire 112*b* may rotate. Accordingly, the first moving frame 140 can be driven in the first direction.

In addition, the second shape memory alloy wire 122*b* may contract according to the electrical signal input, and thus the second frame driving member 121*b* connected to the second shape memory alloy wire 122*b* may rotate. Accordingly, the second moving frame 150 can be driven in the second direction.

In addition, the pair of third shape memory alloy wire 132*a* and 132*c* may contract according to the electrical signal input, and thus the pair of third frame driving members 131*c* and 131*c* connected to the pair of third shape memory alloy wires 132*a* and 132*c* may rotate. Accordingly, the third moving frame 160 may rotate in a clockwise direction.

Accordingly, the image sensor 300 may simultaneously rotate in a counterclockwise direction while moving in a first direction (e.g., −x-axis direction) and a second direction (e.g., −y-axis direction).

Figure 8D:
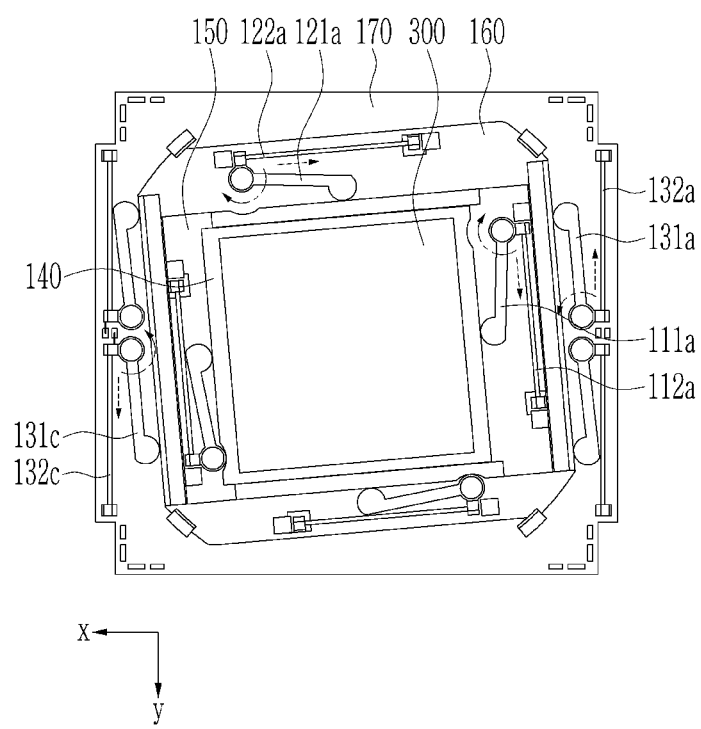

Referring to FIG. 8D, the first shape memory alloy wire 112*a* may contract according to the electrical signal input, and thus the first frame driving member 111*a* connected to the first shape memory alloy wire 112*a* may rotate. Accordingly, the first moving frame 140 can be driven in the first direction.

In addition, the second shape memory alloy wire 122*a* may contract according to an electrical signal input, and thus the second frame driving member 121*a* connected to the second shape memory alloy wire 122*a* may rotate. Accordingly, the second moving frame 150 can be driven in the second direction.

In addition, the pair of third shape memory alloy wires 132*a* and 132*c* may contract according to the electrical signal input, and thus the pair of third frame driving members 131*c* and 131*c* connected to the pair of third shape memory alloy wires 132*a* and 132*c* may rotate. Accordingly, the third moving frame 160 may rotate in a clockwise direction.

Accordingly, the image sensor 300 may simultaneously rotate in a counterclockwise direction while moving in the first direction (e.g., x-axis direction) and the second direction (e.g., y-axis direction).

Figure 8E:
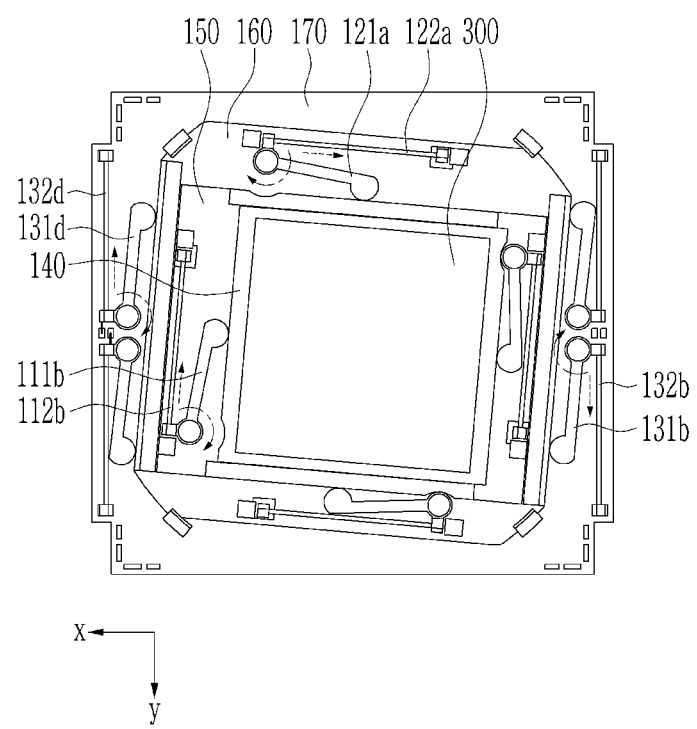

Referring to FIG. 8E, the first shape memory alloy wire 112*b* may contract according to the electrical signal input, and thus the first frame driving member 111*b* connected to the first shape memory alloy wire 112*b* may rotate. Accordingly, the first moving frame 140 can be driven in the first direction.

In addition, the second shape memory alloy wire 122*a* may contract according to an electrical signal input, and thus the second frame driving member 121*a* connected to the second shape memory alloy wire 122*a* may rotate. Accordingly, the second moving frame 150 can be driven in the second direction.

In addition, the pair of third shape memory alloy wires 132*b* and 132*d* may contract according to the electrical signal input, and thus the pair of third frame driving members 131*b* and 131*d* connected to the pair of third shape memory alloy wires 132b and 132d may rotate. Accordingly, the third moving frame 160 may rotate in a clockwise direction.

Accordingly, the image sensor 300 may simultaneously rotate in a clockwise direction while moving in the first direction (e.g., -x direction) and the second direction (e.g., y direction).

Through the above-described first actuator 100, the image sensor 300 can be driven in the first direction and the second direction, as well as rotated, and thus it is possible to improve camera performance by implementing a more precise optical image stabilization function. In addition, since the structures of the first to third sensor driving portions 110, 120, and 130 and the first to third moving frames 140, 150, and 160 are used without using magnets and coils, electromagnetic influence on other devices can be reduced. In addition, the operating range of the actuator can be expanded by using the shape memory alloy wire. The shape memory alloy wire may contract when an electric signal is input to provide a driving force, and when the electric signal input is stopped, the shape memory alloy wire can relax and return to its original state. In the relaxed state, the shape memory alloy wire can be stretched and restored by a predetermined length by an external driving force.

Hereinafter, referring to FIG. 9 to FIG. 16, the second actuator 200 according to an example will be described.

Figure 9:
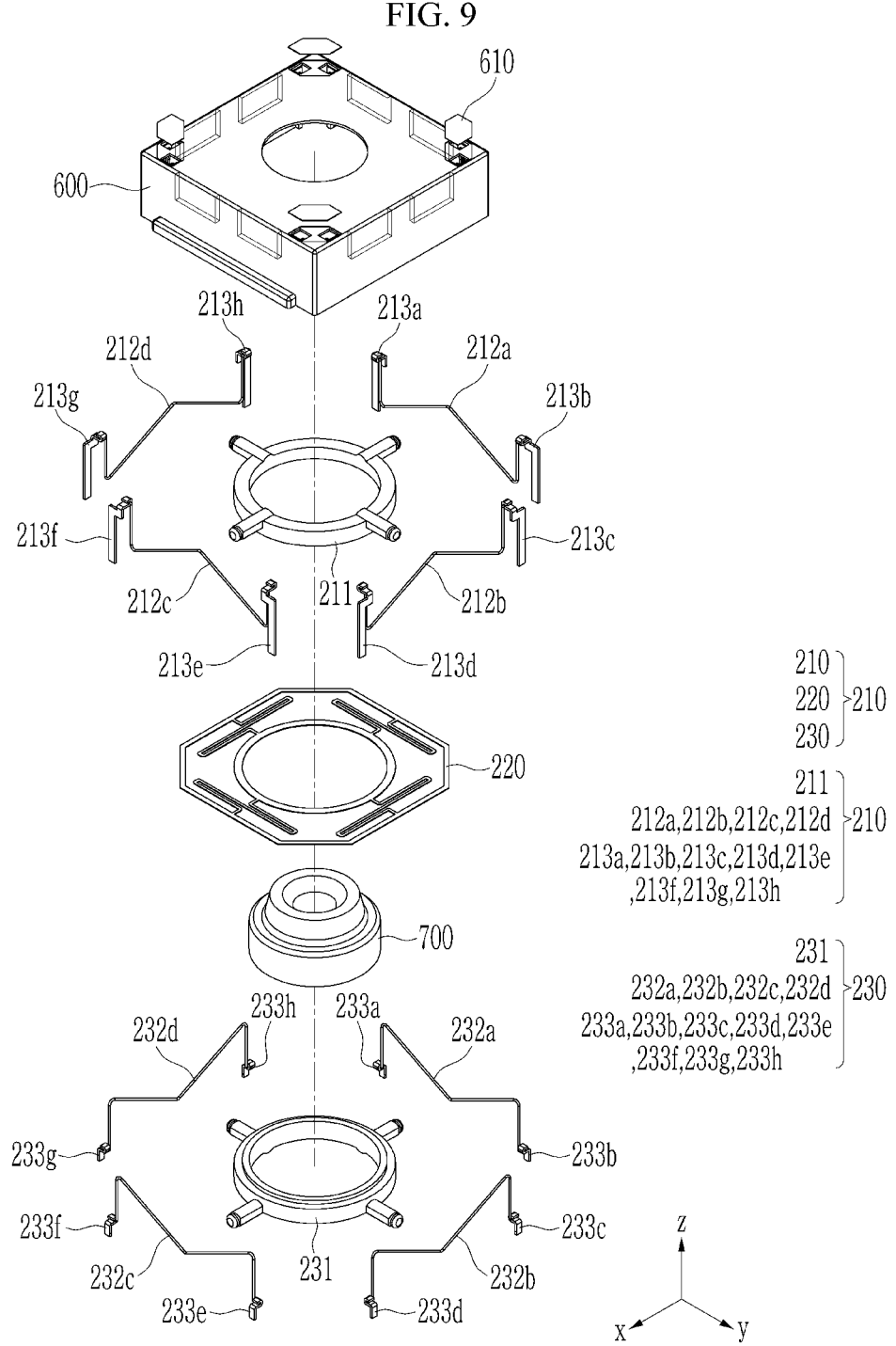
FIG. 9 is an exploded perspective view of the second actuator shown in FIG. 2.
Figure 10A:
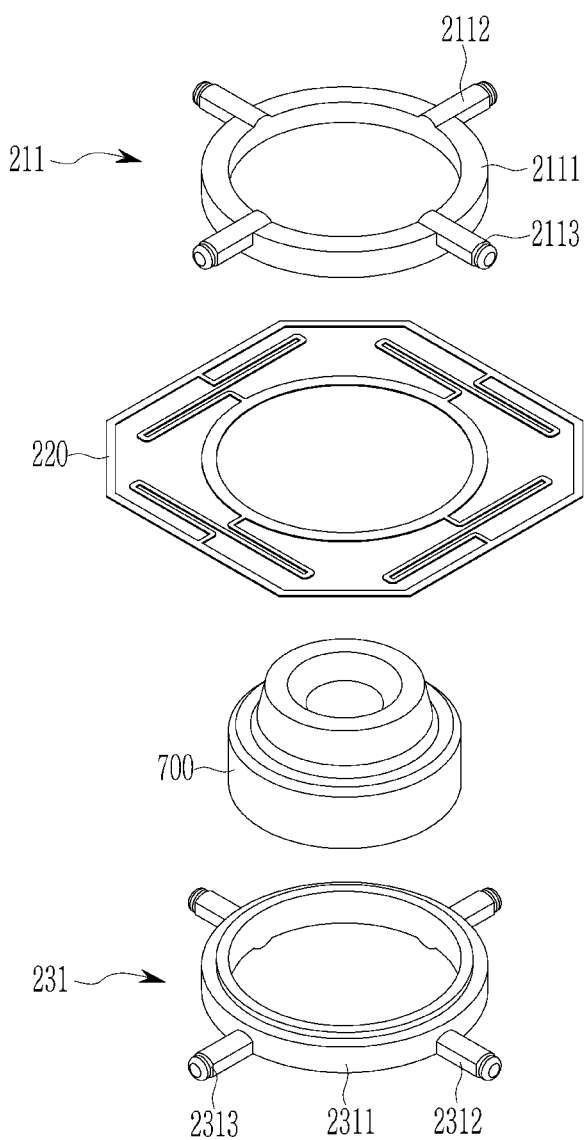
FIG. 10A and FIG. 10B are perspective views of an assembling process of some configuration of the second actuator.
Figure 10B:
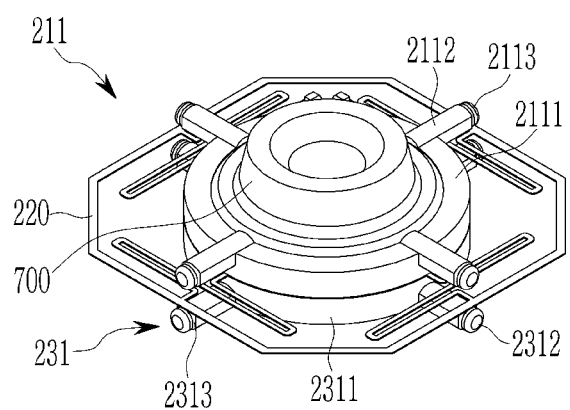

FIG. 9 is an exploded perspective view of the second actuator shown in FIG. 2, and FIG. 10A and FIG. 10B are perspective views of an assembling process of some configuration of the second actuator.

Referring to FIG. 9, FIG. 10A, and FIG. 10B, the second actuator 200 may include a first lens driving portion 210 formed to generate a driving force in a third direction that is parallel to the optical axis (e.g., z-axis direction) downward (e.g., -z direction), a second lens driving portion 230 formed to generate a driving force upward (e.g., z direction) that is parallel to the optical axis, and an elastic member 220 that has an elastic force and provides elastic force to the first lens driving portion 210 and the second lens driving portion 230.

The first lens driving portion 210 may include a first lens driving member 211 that includes a first holder 2111 disposed to surround a lens module 700 and a plurality of first driving arms 2112 disposed on the side of the first holder 2111 and extending in all directions perpendicular to the optical axis, a plurality of fourth shape memory alloy wires 212a, 212b, 212c, and 212d disposed over the first driving arm 2112 and configured to drive the first driving arm 2112 according to an electrical signal input, and a plurality of fourth connection members 213a, 213b, 213c, 213d, 213e, 213f, 213g, and 213h that are connected to both ends of each of the plurality of fourth shape memory alloy wires 212a, 212b, 212c, and 212d.

The second lens driving portion 230 includes a second lens driving member 231a that includes a second holder 2311 disposed to surround the lens module 700 and a plurality of second driving arms 2312 disposed on the side of the second holder 2311 and extending in all directions perpendicular to the optical axis, a plurality of fifth shape memory alloy wires 232a, 232b, 232c, and 232d disposed over the second driving arm 2312 and configured to drive the second driving arm 2312 according to an electrical signal input, and a plurality of fifth connection members 233a, 233b, 233c, 233d, 233e, 233f, 233g, and 233h connected to both ends of each of the plurality of fifth shape memory alloy wires 232a, 232b, 232c, and 232d.

The second actuator 200 may be disposed in an inner space of the case 600, and the protecting member 610 may be disposed in the four corner regions of the case 600. The protecting member 610 may cover openings configured in four corner regions of the case 600.

Referring to FIG. 10A and FIG. 10B, the first lens driving member 211 may be combined with the second lens driving member 231 with the elastic member 220 interposed therebetween. The first lens driving member 211 may have a hole through which the lens module 700 is inserted. The first holder 2111 may have a ring shape, but is not limited thereto. Each of the plurality of first driving arms 2112 may have a cylinder shape protruded from the first holder 2111 in a direction that is perpendicular to the optical axis. Each of the plurality of first driving arms 2112 may have a first driving groove 2113 configured to catch the plurality of fourth shape memory alloy wires 212a, 212b, 212c, and 212d. The first driving groove 2113 may be formed in a ring shape along the circumference of the first driving arm 2112.

The elastic member 220 may be disposed between the first and second lens driving members 211 and 231 to provide an elastic force to the first and second lens driving members 211 and 231. Specifically, when the electric signal input to the plurality of fourth shape memory alloy wires 212a, 212b, 212c, and 212d and the plurality of fifth shape memory alloy wires 232a, 232b, 232c, and 232d is interrupted, respectively, the elastic member 220 may provide an elastic force to the plurality of fourth shape memory alloy wires 212a, 212b, 212c, and 212d and the plurality of fifth shape memory alloy wires 232a, 232b, 232c, and 232d such that they can be relaxed and return to their original state. The elastic member 220 may have a hole through which the lens module 700 is inserted. The elastic member 220 may have a plate shape, but is not limited thereto. The case 600 may have a structure protruded in an inner center direction on one inner surface, and the elastic member 220 may be disposed so as to contact the structure, thereby limiting the moving range of the elastic member 220.

The second lens driving member 231 may have a hole through which the lens module 700 is inserted. The second holder may have a ring shape, but is not limited thereto. Each of the plurality of second driving arms 2312 may have a cylinder shape protruded from the second holder 2311 in a direction that is perpendicular to the optical axis. In addition, each of the plurality of second driving arms 2312 may be aligned with each of the plurality of first driving arms 2112 in an optical axis direction. Each of the plurality of second driving arms 2312 may have a second driving groove 2313 to catch the plurality of fifth shape memory alloy wires 232a, 232b, 232c, and 232d. The second driving groove 2313 may be formed in a ring shape along the circumference of the second driving arm 2312.

Figure 11A:
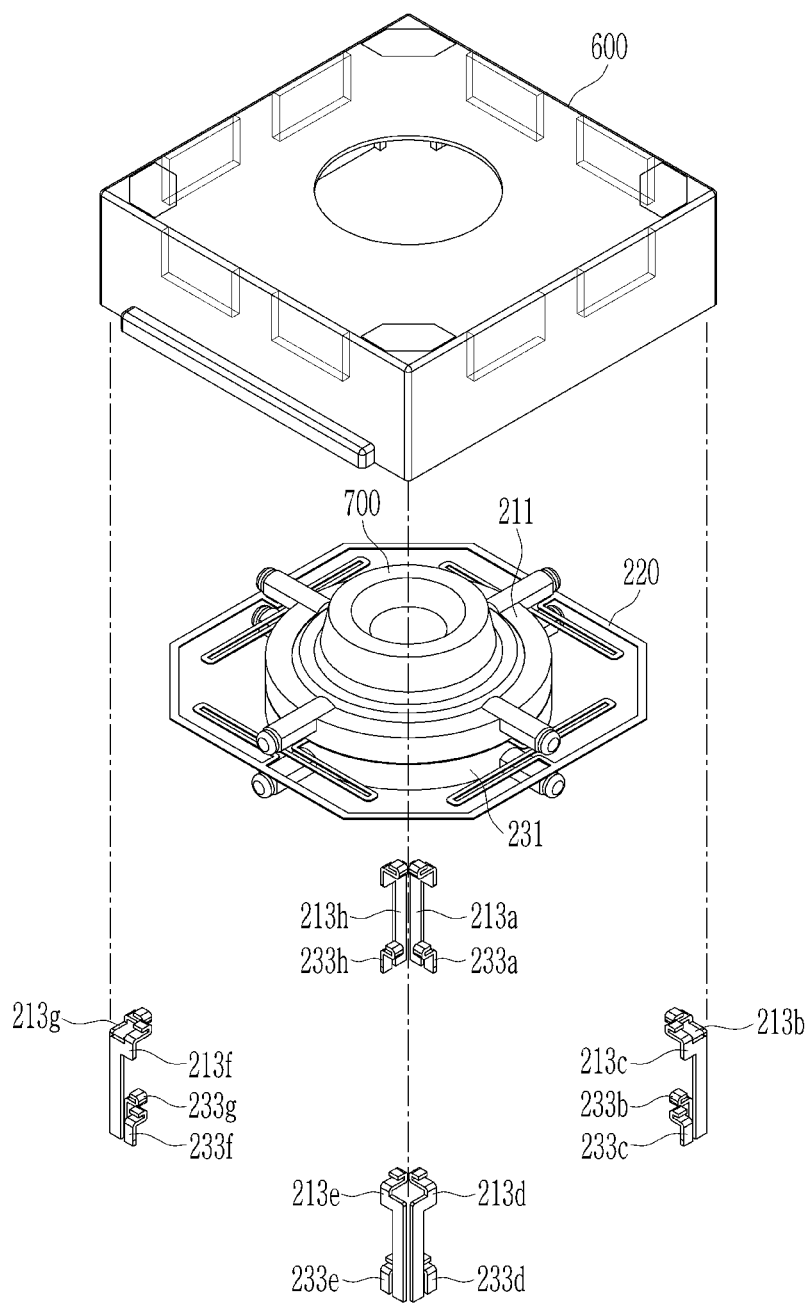
FIG. 11A is an exploded perspective view of some configuration of the second actuator shown in FIG. 2.
Figure 11B:
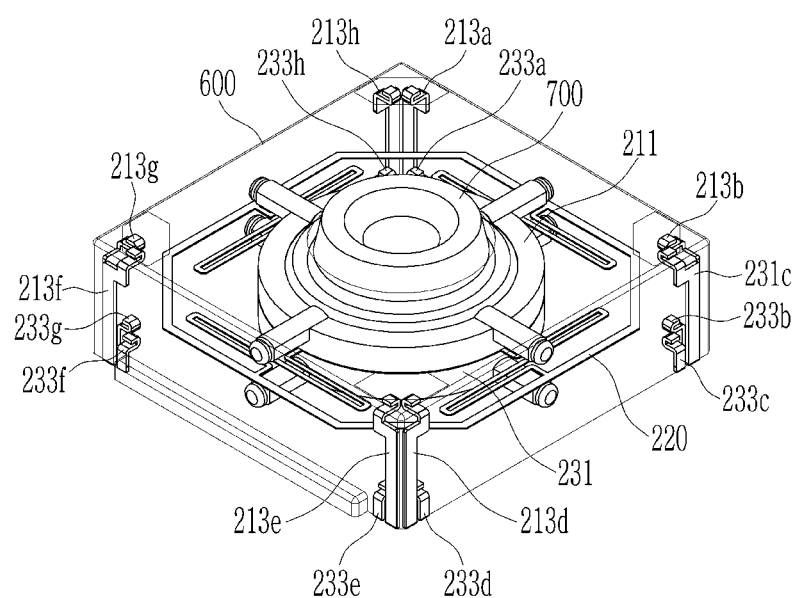
FIG. 11B and FIG. 11C are perspective views of alignments of the fourth and fifth connection members.
Figure 11C:
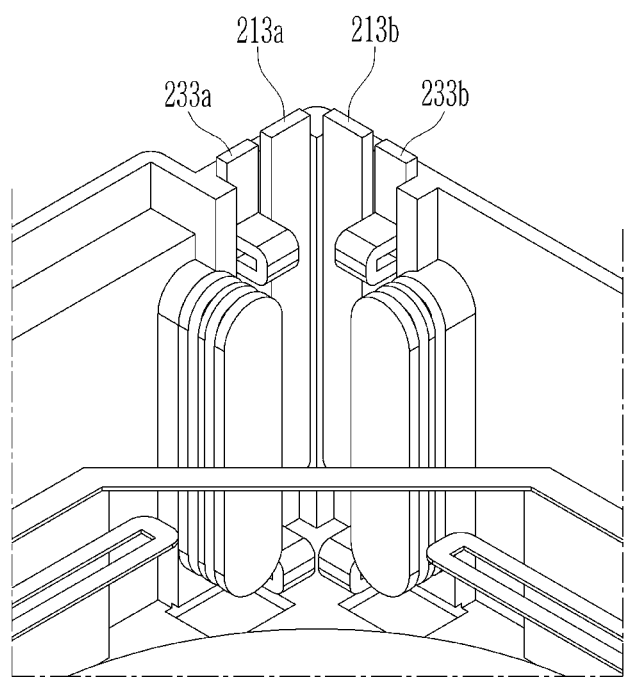

FIG. 11A is an exploded perspective view of some configuration of the second actuator shown in FIG. 2, and FIG. 11B and FIG. 11C are perspective views of alignments of the fourth and fifth connection members.

Referring to FIG. 11A and FIG. 11B, the plurality of fourth connection members 213a, 213b, 213c, 213d, 213e, 213f, 213g, and 213h may be positioned in four corner regions of the case 600. The plurality of fourth connection members 213a, 213b, 213c, 213d, 213e, 213f, 213g, and 213h may have a bent shape such that the plurality of fourth shape memory alloy wires 212a, 212b, 212c, and 212d can be seated. Each of the plurality of fourth connection members 213a, 213b, 213c, 213d, 213e, 213f, 213g, and 213h may be formed of a conductive terminal, and as shown in FIG. 11C, one end of each of the plurality of fourth connection members 213a, 213b, 213c, 213d, 213e, 213f, 213g, and 213h may be electrically connected to the circuit board 400.

For example, the plurality of fourth connection members 213a, 213b, 213c, 213d, 213e, 213f, 213g, and 213h may include a pair of fourth-a connection member 213a and 213b, a pair of fourth-b connection members 213c and 213d, a pair of fourth-c connection member 213e and 213f, and a pair of fourth-d connection members 213g and 213h. Each of the pair of fourth-a connection members 213a and 213b, the pair of fourth-b connection members 213c and 213d, the pair of fourth-c connection members 213e and 213f, and the pair of fourth-d connection members 213g and 213h may be disposed symmetrically with respect to a different first driving arm 2112 among the plurality of first driving arms 2112. In addition, each of the pair of fourth-a connection members 213a and 213b, the pair of fourth-b connection members 213c and 213d, the pair of fourth-c connection members 213e and 213f, and the pair of fourth-d connection members 213g and 213h may be disposed to two corner edge regions of one side of the case 600.

The plurality of fifth connection members 233a, 233b, 233c, 233d, 233e, 233f, 233g, and 233h may be disposed in four corner regions of the case 600. The plurality of fifth connection members 233a, 233b, 233c, 233d, 233e, 233f, 233g, and 233h may have a bent shape such that each of the plurality of fourth shape memory alloy wires 212a, 212b, 212c, and 212d may be seated. Each of the plurality of fifth connection members 233a, 233b, 233c, 233d, 233e, 233f, 233g, and 233h may include a conductive terminal, and as shown in FIG. 11C, one end of each of the plurality of fifth connection members 233a, 233b, 233c, 233d, 233e, 233f, 233g, and 233h may be electrically connected to the circuit board 400. The plurality of fifth connection members 233a, 233b, 233c, 233d, 233e, 233f, 233g, and 233h may have lower heights than the plurality of fourth connection members 213a, 213b, 213c, 213d, 213e, 213f, 213g, and 213h so as to be connected to the second lens driving member 231 disposed below the first lens driving member 211.

For example, the plurality of fifth connection members 233a, 233b, 233c, 233d, 233e, 233f, 233g, and 233h may include a pair of fifth-a connection members 233a and 233b, a pair of fifth-b connection members 233c and 233d, a pair of fifth-c connection members 233e and 233f, and a pair of fifth-d connection members 233g and 233h. Each of the pair of fifth-a connection members 233a and 233b, the pair of fifth-b connection members 233c and 233d, the pair of fifth-c connection members 233e and 233f, and the pair of fifth-d connection members 233g and 233h may be disposed to be symmetrical to each other with reference to any one of the second driving arms 2312 among the plurality of second driving arms 2312. In addition, each of the pair of fifth-a connection members 233a and 233b, the pair of fifth-b connection members 233c and 233d, the pair of fifth-c connection members 233e and 233f, and the pair of fifth-d connection members 233g and 233h can be disposed to two edge regions of one side of the case 600.

Hereinafter, referring to FIG. 12A to FIG. 12C, the first lens driving portion 210 will be described.

Figure 12A:
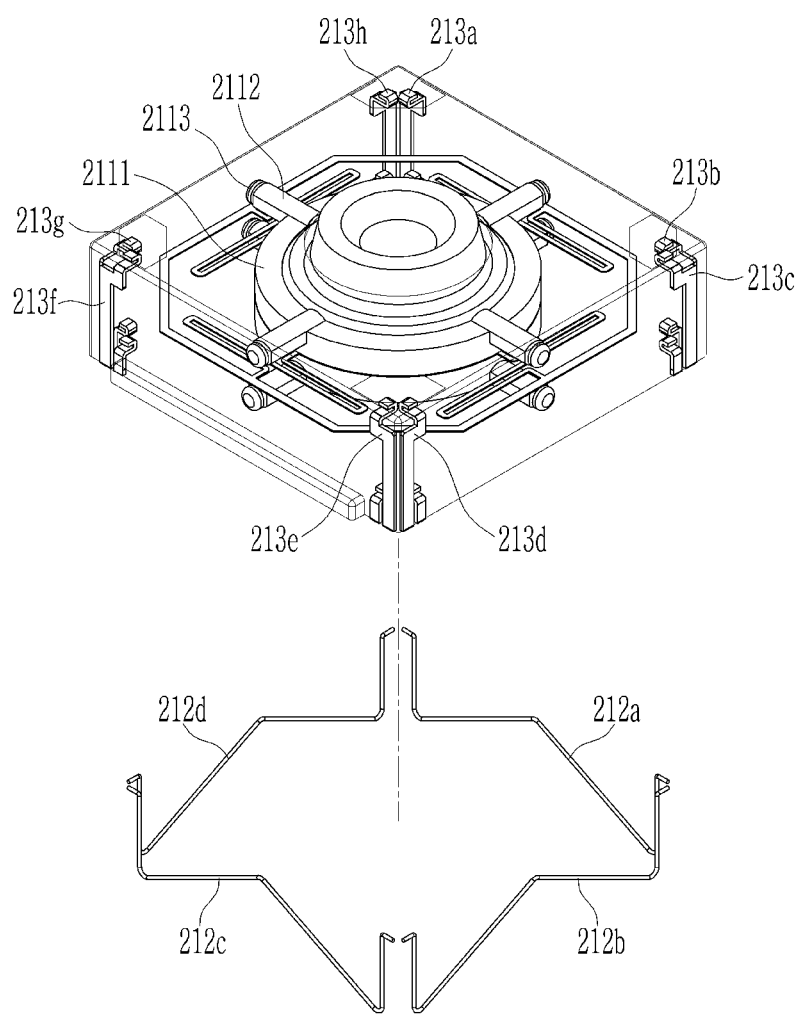
FIG. 12A is an exploded perspective view of some configuration of the second actuator shown in FIG. 2.
Figure 12B:
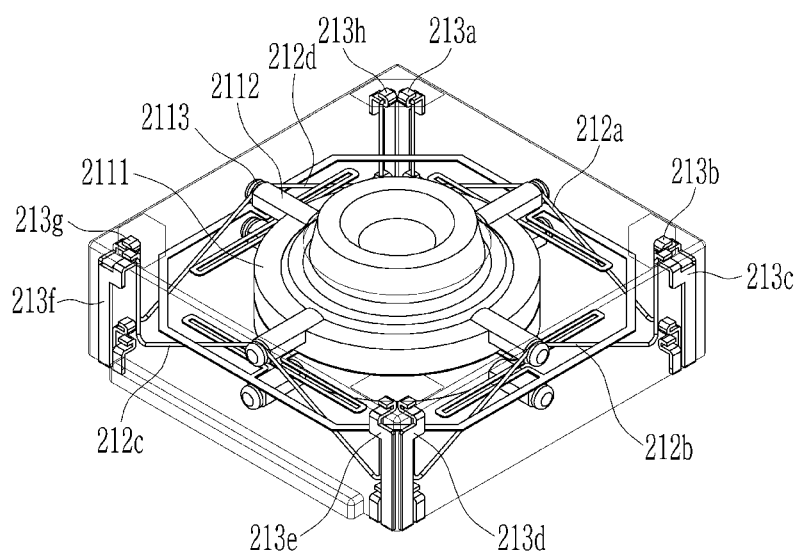
FIG. 12B is a perspective view of an alignment of the fourth shape memory alloy wires.
Figure 12C:
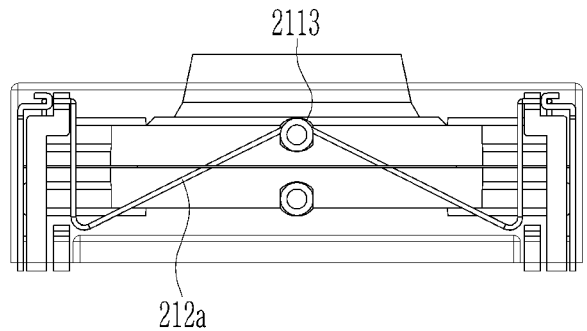
FIG. 12C is a top plan view of an alignment of the fourth shape memory alloy wires.

FIG. 12A is an exploded perspective view of some configuration of the second actuator shown in FIG. 2, FIG. 12B is a perspective view of an alignment of the fourth shape memory alloy wires, and FIG. 12C is a top plan view of an alignment of the fourth shape memory alloy wires.

Referring to FIG. 12A to FIG. 12C, each of the plurality of fourth shape memory alloy wires 212a, 212b, 212c, and 212d may be disposed over to each of the plurality of first driving arms 2112 extending in all directions. The plurality of fourth shape memory alloy wires 212a, 212b, 212c, and 212d may be configured to generate driving force downward in a third direction that is parallel to the optical axis. For example, both ends of each of the plurality of fourth shape memory alloy wires 212a, 212b, 212c, and 212d are respectively disposed in a pair disposed on the same plane among the plurality of fourth connection members 213a, 213b, 213c, 213d, 213e, 213f, 213g, and 213h, and a middle portion may be caught in the first driving groove 2113 disposed in each of the plurality of first driving arms 2112. Each of the plurality of fourth shape memory alloy wires 212a, 212b, 212c, and 212d may contact an upper surface of the optical axis direction of the first driving groove 2113.

In the first lens driving portion 210, the plurality of fourth shape memory alloy wires 212a, 212b, 212c, and 212d contract according to the electrical signal that is selectively input to the plurality of fourth shape memory alloy wires 212a, 212b, 212c, and 212d, and thus an end of the plurality of first driving arms 2112 connected thereto may be selectively driven downward in a third direction parallel to the optical axis. Accordingly, the lens module 700 accommodated in the first holder 2111 may be driven to move downward or tilt in one direction along the third direction.

Hereinafter, referring to FIG. 13A to FIG. 13C, the second lens driving portion 230 will be described.

Figure 13A:
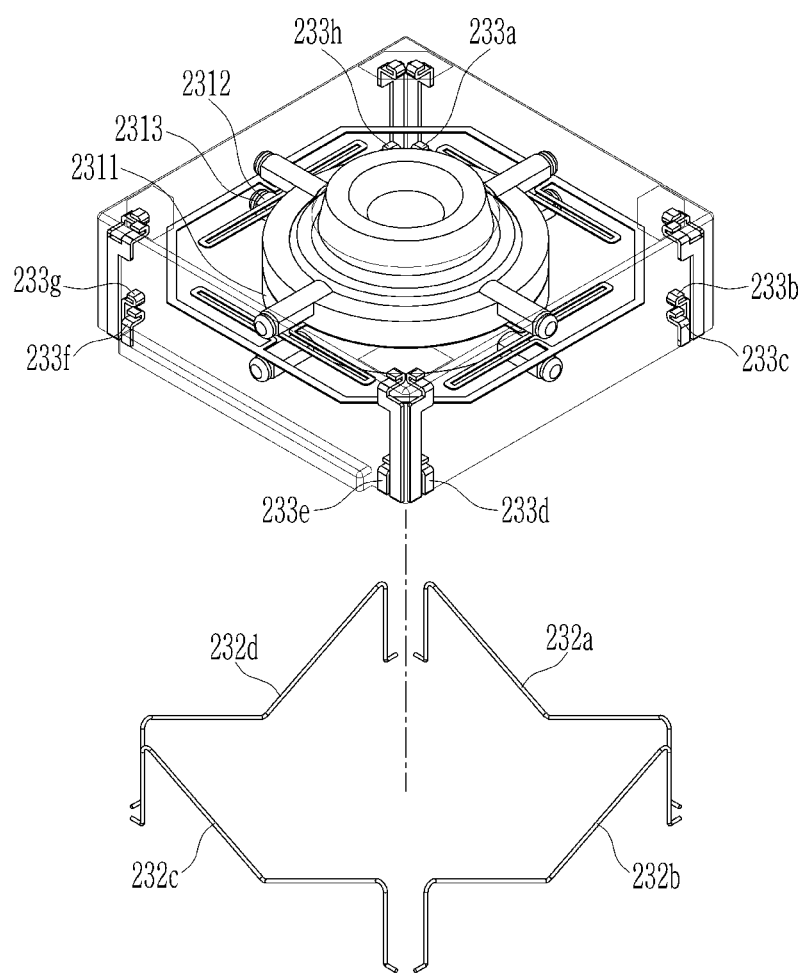
FIG. 13A is an exploded perspective view of some configuration of the second actuator shown in FIG. 2.
Figure 13B:
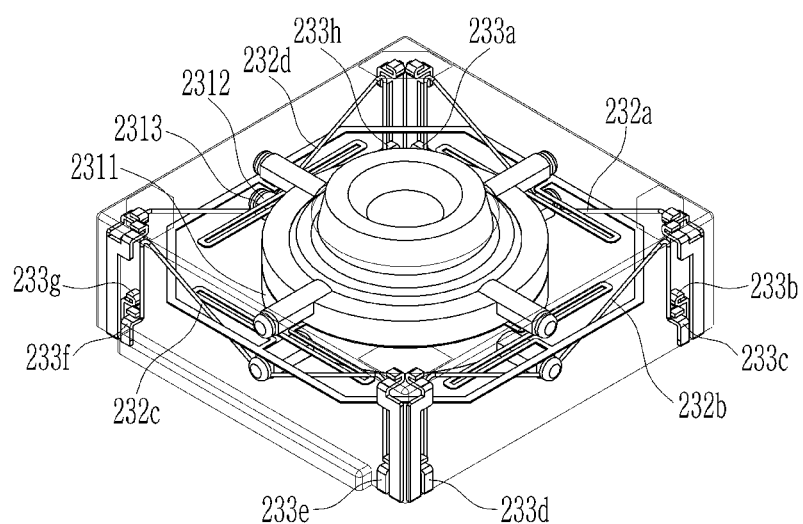
FIG. 13B is a perspective view of an alignment of the fifth shape memory alloy wires.
Figure 13C:
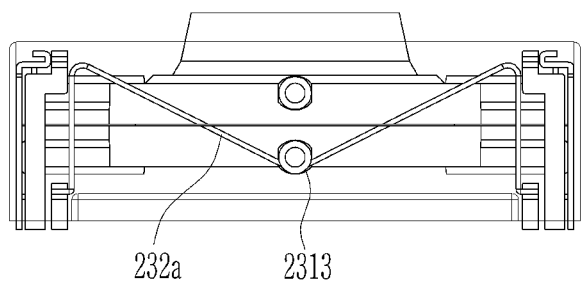
FIG. 13C is a top plan view of an alignment of the fifth shape memory alloy wires.

FIG. 13A is an exploded perspective view of some configuration of the second actuator shown in FIG. 2, FIG. 13B is a perspective view of an alignment of the fifth shape memory alloy wires, and FIG. 13C is a top plan view of an alignment of the fifth shape memory alloy wires.

Referring to FIG. 13A to FIG. 13C, each of the plurality of fifth shape memory alloy wires 232a, 232b, 232c, and 232d may be disposed over to each of the plurality of second driving arms 2312 extending in all directions. The plurality of fifth shape memory alloy wires 232a, 232b, 232c, and 232d may be configured to generate driving force in an upward direction parallel to the optical axis. For example, both ends of each of the plurality of fifth shape memory alloy wires 232a, 232b, 232c, and 232d are respectively disposed in a pair disposed on the same plane among the plurality of fifth connection members 233a, 233b, 233c, 233d, 233e, 233f, 233g, and 213h, and a middle portion may be caught in the second driving groove 2313 disposed in each of the plurality of second driving arms 2312. Each of the plurality of fifth shape memory alloy wires 232a, 232b, 232c, and 232d may contact a lower surface of the optical axis direction of the second driving groove 2313.

In the second lens driving portion 230, the plurality of fifth shape memory alloy wires 232a, 232b, 232c, and 232d may contract according to the electrical signal that is selectively input to the plurality of fifth shape memory alloy wires 232a, 232b, 232c, and 232d, and ends of the plurality of second driving arms 2312 connected thereto can be selectively driven upward in a third direction parallel to the optical axis. Accordingly, the lens module 700 accommodated in the second holder 2311 may be driven to move upward or tilt to one side along the third direction.

Hereinafter, referring to FIG. 14 to FIG. 16, a driving method of the second actuator 200 will be described.

Figure 14:
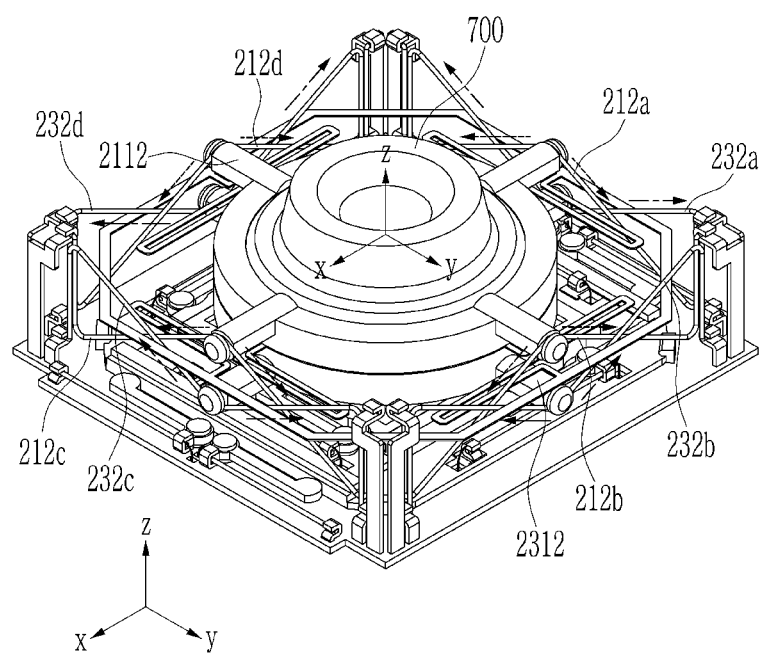
FIG. 14 is a perspective view that shows the lens module driven in the optical axis direction.

FIG. 14 is a perspective view that shows the lens module driven in the optical axis direction.

Referring to FIG. 14, the plurality of fourth shape memory alloy wires 212a, 212b, 212c, and 212d may contract according to the electrical signal input, and thus ends of the plurality of first driving arms 2112 connected to the plurality of fourth shape memory alloy wires 212a, 212b, 212c, and 212d may be driven downward parallel to the optical axis. Accordingly, the lens module 700 accommodated in the first holder 2111 can be driven downward parallel to the optical axis of the third direction.

In addition, the plurality of fifth shape memory alloy wires 232a, 232b, 232c, and 232d may contract according to the electrical signal input, and thus ends of the plurality of second driving arms 2312 connected to the plurality of fifth shape memory alloy wires 232a, 232b, 232c, and 232d may be driven upward in parallel with the optical axis. Accordingly, the lens module 700 accommodated in the second holder 2311 can be driven upward parallel to the optical axis.

Therefore, the auto focus adjustment function can be realized by driving the lens module 700 upward or downward in the optical axis direction.

Figure 15:
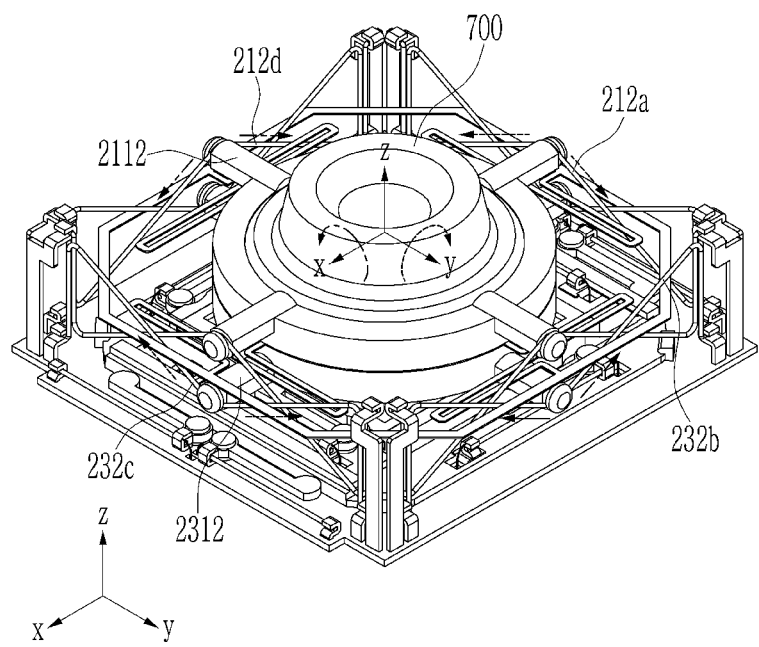
FIG. 15 is a perspective view that shows the lens module rotating along the x-axis or y-axis.

FIG. 15 is a perspective view that shows the lens module rotating along the x-axis or y-axis.

Referring to FIG. 15, the fourth shape memory alloy wire 212d and the fifth shape memory alloy wire 232b disposed in the opposite direction may contract according to the electrical signal input. Accordingly, the end of the first driving arm 2112 connected to the fourth shape memory alloy wire 212d may be driven downward parallel to the optical axis. In addition, an end of the second driving arm 2312 connected to the fifth shape memory alloy wire 232b that is disposed in a direction opposite to the fourth shape memory alloy wire 212d may be driven upward parallel to the optical axis. Accordingly, the lens module 700 accommodated in the first holder 2111 and the second holder 2311 can be rotated based on the x-axis.

In addition, the fourth shape memory alloy wire 212a and the fifth shape memory alloy wire 232c disposed in the opposite direction may contract according to the electrical signal input. Accordingly, the end of the first driving arm 2112 connected to the fourth shape memory alloy wire 212a may be driven downward parallel to the optical axis. In addition, an end of the second driving arm 2312 connected to the fifth shape memory alloy wire 232c disposed in a direction opposite to the fourth shape memory alloy wire 212a may be driven upward parallel to the optical axis. Accordingly, the lens module 700 accommodated in the first holder 2111 and the second holder 2311 can be rotated based on the y-axis.

Figure 16:
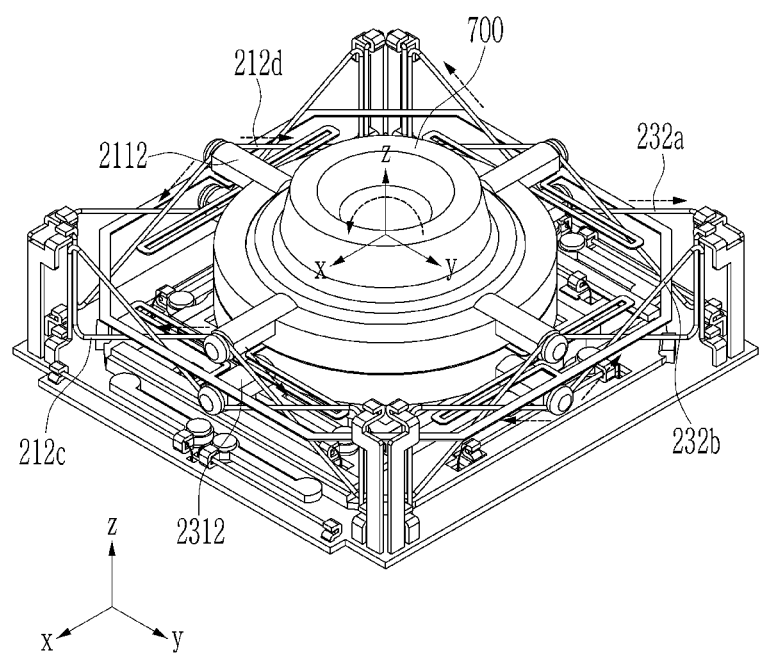
FIG. 16 is a perspective view that shows the tilt-driving of the lens module.

FIG. 16 is a perspective view that shows the tilt-driving of the lens module.

Referring to FIG. 16, the pair of fourth shape memory alloy wires 212c and 212d adjacent to each other and the pair of fifth shape memory alloy wires 232a and 232b disposed adjacent to each other and disposed in a direction opposite to the pair of fourth shape memory alloy wires 212c and 212d may contract according to the electrical signal input. Accordingly, ends of the pair of first driving arms 2112 connected to the pair of adjacent fourth shape memory alloy wires 212c and 212d may be driven downward parallel to the optical axis. In addition, ends of the pair of second driving arms 2312 connected to the pair of fifth shape memory alloy wires 232a and 232b disposed in a direction opposite to the pair of adjacent fourth shape memory alloy wires 212c and 212d can be driven upward in parallel with the optical axis. Accordingly, the lens module 700 accommodated in the first holder 2111 and the second holder 2311 can be rotated and tilted based on an arbitrary axis perpendicular to the optical axis.

Through the second actuator 200 described above, the lens module 700 can be driven up and down in the direction of the optical axis, rotated based on the x-axis or y-axis, and also rotated based on an arbitrary axis that is perpendicular to the optical axis, and thus it is possible to improve camera performance by implementing more precise auto focus adjustment and shooting functions. In addition, since the first and second lens driving portions 210 and 230 are used instead of magnets and coils, electromagnetic influence on other devices can be reduced. In addition, the operating range of the actuator can be expanded by using a shape memory alloy wire.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for a camera, comprising:
   a base;
   a first moving frame, a second moving frame, and a third moving frame stacked on the base along an optical axis;
   an image sensor mounted on the first moving frame;
   a first sensor driving portion including a plurality of first frame driving members and a plurality of first shape memory alloy wires disposed outside an edge of the first moving frame and interlocked with each other to drive the first moving frame in a first direction perpendicular to the optical axis;
   a second sensor driving portion including a plurality of second frame driving members and a plurality of second shape memory alloy wires disposed outside an edge of the second moving frame and interlocked with each other to drive the second moving frame in a second direction perpendicular to the first direction; and
   a third sensor driving portion including a plurality of third frame driving members and a plurality of third shape memory alloy wires disposed outside an edge of the third moving frame and interlocked with each other to rotatably drive the third moving frame based on the optical axis.

2. The actuator of claim 1, wherein
   the first moving frame includes a first stepped portion extending along a pair of opposite sides of the first moving frame,
   the second moving frame includes a second stepped portion having a shape that is complementary to the first stepped portion disposed along a pair of opposite sides of the second moving frame, and
   the first stepped portion is configured to be engaged with the second stepped portion with a space therebetween.

3. The actuator of claim 1, wherein
   a first end of each of the first frame driving members is fixed to be rotatable outside one corner of the first moving frame and a second end of each of the first frame driving members contacts the edge of the first moving frame, each of the first shape memory alloy wires is respectively coupled to the first end of each of the first frame driving members to provide rotation driving force, a first end of each of the second frame driving members is fixed to be rotatable outside one corner of the second moving frame and a second end of each of the second frame driving members contacts the edge of the second moving frame, and each of the second shape memory alloy wires is respectively coupled to the first end of each of the second frame driving members to provide rotation driving force.

4. The actuator of claim 1, wherein the second moving frame includes an expansion portion extending outward along a pair of opposite sides of the second moving frame, the third moving frame includes a third stepped portion extending along a pair of opposite sides of the third moving frame, and the third stepped portion is raised and has a shape retracted outward from an inner edge of the third moving frame, and the expansion portion is coupled to the third stepped portion through a retracted space of the third stepped portion with a space therebetween.

5. The actuator of claim 1, wherein a first end of each of the third frame driving members is fixed to be rotatable at the edge of the third moving frame and a second end of each of the third frame driving members contacts with the outside of one corner of the third moving frame, and each of the third shape memory alloy wires is respectively coupled to the first end of each of the third frame driving members to provide rotation driving force.

6. The actuator of claim 1, wherein the base comprises a guide member disposed in a region where four corners of the third moving frame are disposed and is formed in a shape that is bent toward a center by being protruded on the base.

7. The actuator of claim 1, wherein the plurality of first frame driving members include a pair of first frame driving members, each of the pair of first frame driving members is disposed diagonally opposite to the second moving frame, the plurality of second frame driving members include a pair of second frame driving members, and each of the pair of second frame driving members is disposed diagonally opposite to the third moving frame.

8. The actuator of claim 1, wherein the plurality of third frame driving members include a first pair of third frame driving members and a second pair of third frame driving members, each of the first pair of third frame driving members is disposed diagonally opposite to the base, and each of the second pair of third frame driving members is disposed on the base to be symmetrical with the first pair of third frame driving members with a straight line that passes through the optical axis and parallel to the base as an axis.

9. A camera module comprising:

a case defining an inner space;

a lens module disposed in the inner space;

a base disposed on one side of the case;

a first moving frame, a second moving frame, and a third moving frame stacked on the base in an optical axis direction;

an image sensor mounted on the first moving frame;

a first sensor driving portion including a plurality of first frame driving members and a plurality of first shape memory alloy wires disposed outside an edge of the first moving frame and interlocked with each other to drive the first moving frame in a first direction perpendicular to an optical axis;

a second sensor driving portion including a plurality of second frame driving members and a plurality of second shape memory alloy wires disposed outside an edge of the second moving frame and interlocked with each other to drive the second moving frame in a second direction perpendicular to the first direction; and a third sensor driving portion including a plurality of third frame driving members and a plurality of third shape memory alloy wires disposed outside an edge of the third moving frame and interlocked with each other to rotatably drive the third moving frame based on the optical axis.

10. The camera module of claim 9, wherein the plurality of first frame driving members comprise a pair of first frame driving members, each of the pair of first frame driving members is disposed diagonally opposite to the second moving frame, the plurality of second frame driving members comprise a pair of second frame driving members, each of the pair of second frame driving members is disposed diagonally opposite to the third moving frame, the plurality of third frame driving members comprise a first pair of third frame driving members and a second pair of third frame driving members, each of the first pair of third frame driving members is disposed diagonally opposite to the base, and each of the second pair of third frame driving members is disposed on the base to be symmetrical with the first pair of third frame driving members with a straight line that passes through the optical axis and parallel to the base as an axis.

* * * * *